US012593059B2

(12) United States Patent
Mahara

(10) Patent No.: US 12,593,059 B2
(45) Date of Patent: Mar. 31, 2026

(54) IMAGING APPARATUS AND IMAGING METHOD FOR GENERATING SIGNATURE DATA BASED ON COMPRESSED IMAGE DATA

(71) Applicant: Sony Semiconductor Solutions Corporation, Kanagawa (JP)

(72) Inventor: Kumiko Mahara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 108 days.

(21) Appl. No.: 18/263,774

(22) PCT Filed: Jan. 25, 2022

(86) PCT No.: PCT/JP2022/002492
§ 371 (c)(1),
(2) Date: Aug. 1, 2023

(87) PCT Pub. No.: WO2022/168659
PCT Pub. Date: Aug. 11, 2022

(65) Prior Publication Data
US 2024/0121419 A1    Apr. 11, 2024

(30) Foreign Application Priority Data

Feb. 8, 2021    (JP) ................................. 2021-018592

(51) Int. Cl.
*H04N 19/467* (2014.01)
*G06F 21/64* (2013.01)
(Continued)

(52) U.S. Cl.
CPC ........... *H04N 19/467* (2014.11); *G06F 21/64* (2013.01); *H04N 25/11* (2023.01); *H04N 25/79* (2023.01)

(58) Field of Classification Search
CPC ....... G06F 21/64; G06F 21/83; H04L 9/0866; H04N 19/467; H04N 23/611; H04N 23/665; H04N 23/80; H04N 25/11; H04N 25/79
See application file for complete search history.

(56) References Cited

U.S. PATENT DOCUMENTS 7,596,277 B2 * 9/2009 Govindaswamy ..... H04N 19/89
                                                            375/240.27
11,418,677 B2 * 8/2022 Chen .................. H04N 1/32272
                        (Continued)

FOREIGN PATENT DOCUMENTS

JP          01314473 A  * 12/1989
JP      H01314473 A     12/1989
                    (Continued)

OTHER PUBLICATIONS

International Search Report (PCT/ISA/210), International Application No. PCT/JP2022/002492, dated Apr. 12, 2022.

*Primary Examiner* — Antoinette T Spinks
(74) *Attorney, Agent, or Firm* — Michael Best & Friedrich LLP

(57)                    ABSTRACT

An imaging apparatus according to an embodiment includes a pixel array unit (101) including a plurality of pixels arranged in a matrix array, each of the pixels generating a pixel signal corresponding to light received by exposure, the pixel array unit acquiring image data based on each of the pixel signals respectively generated by the plurality of pixels, a compression unit (1020) configured to compress a data amount of the image data to generate compressed image data, a signature generation unit (1021) configured to generate signature data based on the compressed image data; and an output unit (104,131,132) configured to output the (Continued)

image data and authenticity proof data obtained by adding the signature data to the compressed image data.

17 Claims, 24 Drawing Sheets

(51) Int. Cl.
   H04N 25/11         (2023.01)
   H04N 25/79         (2023.01)

(56)                References Cited

U.S. PATENT DOCUMENTS

2003/0190078 A1* 10/2003 Govindaswamy ..... H04N 19/89
                                                  382/232
2014/0185676 A1   7/2014 Chen

| | | | | |
|---|---|---|---|---|
| 2015/0126283 | A1* | 5/2015 | Okino | ..................... A63F 13/71 |
| | | | | 463/42 |
| 2019/0104251 | A1 | 4/2019 | Otsuki | |
| 2019/0158698 | A1* | 5/2019 | Chen | ...................... H04N 19/85 |
| 2021/0287322 | A1* | 9/2021 | Yaffe | ..................... H04L 9/3247 |
| 2023/0262210 | A1* | 8/2023 | Zhong | ................. H04N 19/146 |
| | | | | 375/240.03 |
| 2023/0403473 | A1* | 12/2023 | Numata | ................. H04N 23/71 |

FOREIGN PATENT DOCUMENTS

| | | | |
|---|---|---|---|
| JP | H05207273 | A | 8/1993 |
| JP | H11150703 | A | 6/1999 |
| JP | 2004120117 | A | 4/2004 |
| JP | 2009177253 | A | 8/2009 |
| JP | 2017184198 | A | 10/2017 |
| WO | 2012164896 | A1 | 12/2012 |

* cited by examiner (a)

IMAGING APPARATUS AND IMAGING METHOD FOR GENERATING SIGNATURE DATA BASED ON COMPRESSED IMAGE DATA

FIELD

The present disclosure relates to an imaging apparatus and an imaging method.

BACKGROUND

In recent years, along with improvement in image processing technology, authenticity proof for proving that an image is authentic (not falsified) has become important. In order to prove authenticity of the image, it is conceivable to add a signature to an image to be captured by a sensor in the sensor and output the image to the outside of the sensor. For example, signature data is generated based on RAW data captured by the sensor, and the RAW data to which the signature data is added is output to the outside of the sensor. The RAW data output to the outside of the sensor is generally subjected to image processing such as contrast adjustment or compression encoding processing, and the same is used as a processed image. Patent Literature 1 describes an image sensor configured to output signature information in association with image information.

RAW data can be proved to be authentic based on added signature data. Therefore, it is possible to determine presence or absence of falsification of a processed image by comparing the processed image obtained by image-processing the RAW data with the image based on the RAW data in the outside of the sensor.

CITATION LIST

Patent Literature

Patent Literature 1: JP 2017-184198 A

SUMMARY

Technical Problem

In the existing authenticity proof method described above, it is necessary to store RAW data and a signature thereof for indicating that a processed image is not falsified together with the processed image subjected to image processing. Therefore, in the existing authenticity proof method, a load on a memory in a camera on which a sensor is mounted and a load at the time of transferring data from the camera become large.

An object of the present disclosure is to provide an imaging apparatus and an imaging method capable of generating an image with a smaller load on processing of performing authenticity proof.

Solution to Problem

For solving the problem described above, an imaging apparatus according to one aspect of the present disclosure has a pixel array unit including a plurality of pixels arranged in a matrix array, each of the pixels generating a pixel signal corresponding to light received by exposure, the pixel array unit acquiring image data based on each of the pixel signals respectively generated by the plurality of pixels; a compression unit configured to compress a data amount of the image data to generate compressed image data; a signature generation unit configured to generate signature data based on the compressed image data; and an output unit configured to output the image data and authenticity proof data obtained by adding the signature data to the compressed image data.

BRIEF DESCRIPTION OF DRAWINGS

FIG. 9 is a block diagram illustrating a configuration of an example of a sensor according to a first embodiment.

FIG. 19 is a block diagram illustrating a configuration of an example of a sensor according to the fifth embodiment.

FIG. 21 is a schematic diagram illustrating an execution example of authenticity proof of an image.

FIG. 22 is a schematic diagram schematically illustrating a system configuration for proving authenticity of an image according to a seventh embodiment.

DESCRIPTION OF EMBODIMENTS

Figure 1:
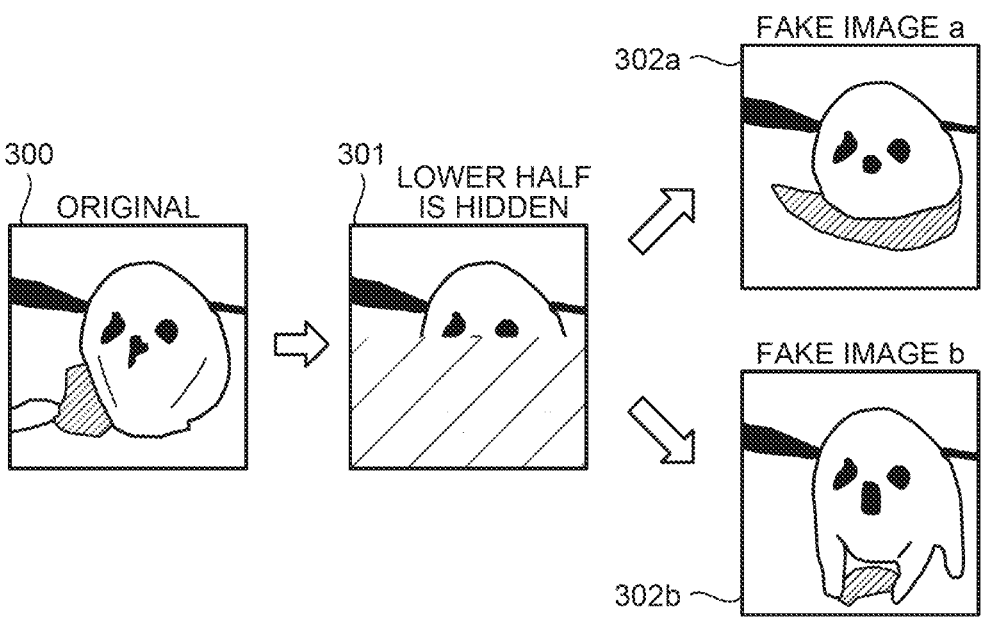
FIG. 1 is a schematic diagram illustrating an example of fake image generation according to an existing technology.

Hereinafter, embodiments of the present disclosure will be described in detail with reference to the drawings. It is noted that, in the following embodiments, the same parts are denoted by the same reference numerals, and redundant description will be omitted.

Hereinafter, embodiments of the present disclosure will be described in the following order.

1. Regarding existing technology
2. Technology applicable to each embodiment of present disclosure
3. Outline of each embodiment of present disclosure
4. First embodiment of present disclosure
4-1. Configuration according to first embodiment
4-2. Data amount compression method applicable to first embodiment
5. Second embodiment of present disclosure
6. Third embodiment of present disclosure
7. Fourth embodiment of present disclosure
8. Fifth embodiment of present disclosure
8-1. Configuration example of pixel
8-2. Configuration according to fifth embodiment
9. Sixth embodiment of present disclosure
10. Seventh embodiment of present disclosure
10-1. System configuration for performing image authenticity determination according to seventh embodiment
10-2. Image comparison processing according to seventh embodiment

1. Regarding Existing Technology

First, prior to the description of the embodiments of the present disclosure, an existing technology related to the technology of the present disclosure will be described in order to facilitate understanding. In recent years, authenticity proof of an image published via the Internet by a news medium, a social networking service (SNS), or the like has been a problem. That is, in recent years, it is difficult to prove authenticity of an image due to development of an image processing tool and a fake (fabricated) image generation technology using artificial intelligence (AI).

Figure 2:
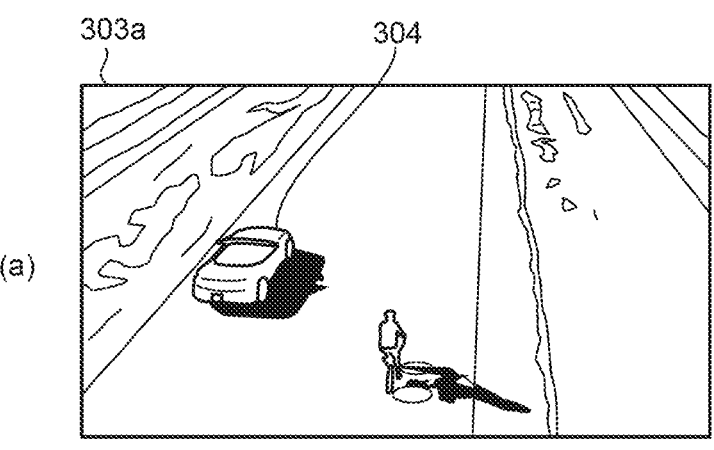
FIG. 2 is a schematic diagram illustrating an example of the fake image generation according to the existing technology.
Figure 2:
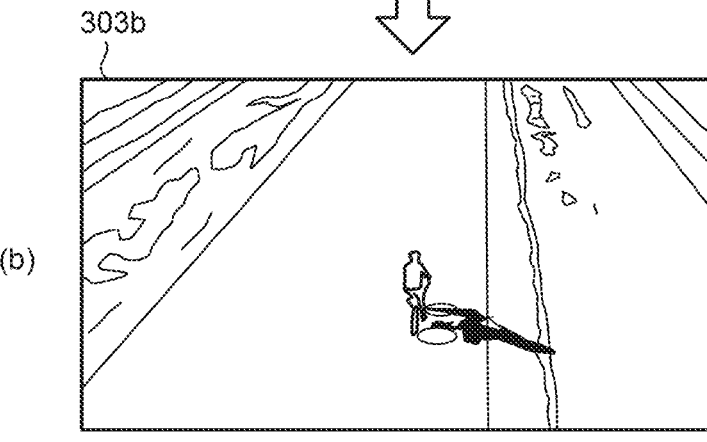

FIGS. 1 and 2 are schematic diagrams illustrating an example of fake image generation according to the existing technology. For example, as illustrated in FIG. 1, there is known a technology of generating an image 301 in which a lower half of an original image 300 is hidden, predicting the lower half based on the image 301, and generating an image

302*a* (fake image a) or an image 302*b* (fake image b) different from the image 302*a*.

In addition, in the case of a moving image as well, a technology is known in which only a moving object 304 included in a frame 303*a* can be deleted from the frame 303*a* of the moving image illustrated in a section (a) of FIG. 2. In this case, in a frame 303*b* temporally close to the frame 303*a*, the frame 303*b* being illustrated in a section (b), the object 304 is deleted, and a position at which the object 304 should originally exist is replaced with a road surface.

In these examples, when the original image 300 and the frame 303*a* are not known, it is difficult to determine whether the images 302*a* and 302*b* and the frame 303*b* are falsified fake images, that is, to prove the authenticity of the images 302*a* and 302*b* and the frame 303*b*.

As one of such methods of facilitating authenticity proof of an image, a method is known in which a signature is added to a captured image to be an original image inside a sensor configured to acquire the captured image, and encryption processing is performed on the original image to which the signature is added.

Figure 3A:
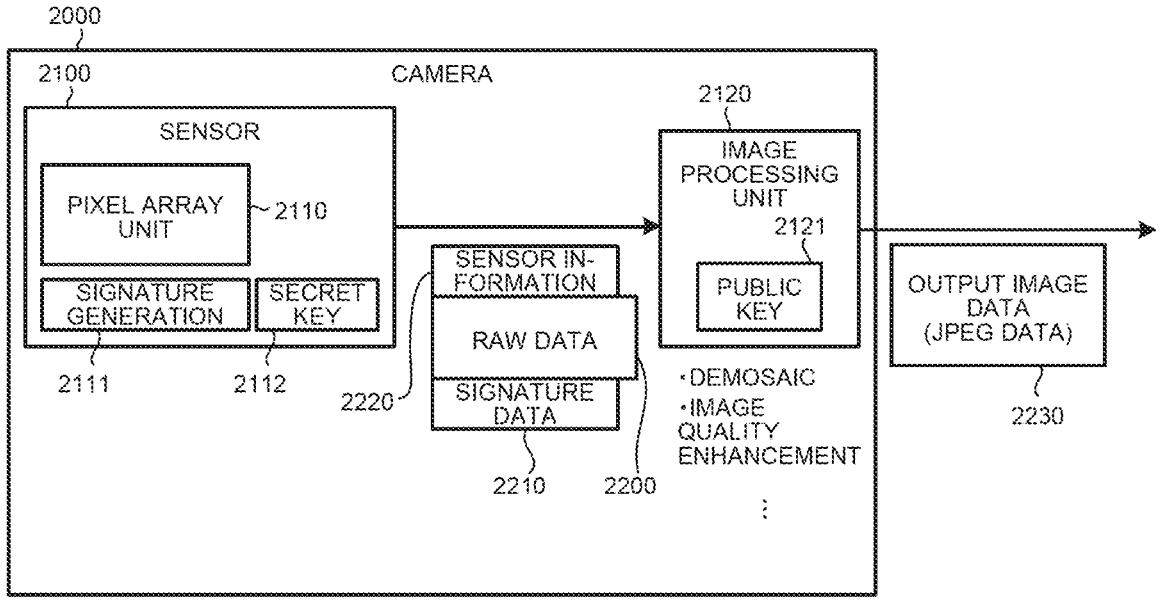
FIG. 3A is a schematic diagram schematically illustrating a configuration example of a camera using a sensor configured to add signature data to image data and outputs the image data according to the existing technology.

FIG. 3A is a schematic diagram schematically illustrating a configuration example of a camera using a sensor configured to add signature data to image data and outputs the image data according to the existing technology.

In FIG. 3A, a camera 2000 includes a sensor 2100 and an image processing unit 2120. The sensor 2100 includes a plurality of pixels arranged in a matrix array, each of the pixels generating a pixel signal corresponding to received light, and the same is configured by, for example, one semiconductor chip (or a plurality of bonded semiconductor chips). The sensor 2100 acquires RAW data on a frame-by-frame basis based on the pixel signal generated by each of the plurality of pixels according to exposure. The RAW data is unprocessed data that is not subjected to demosaic processing or the like on pixel data based on a pixel signal.

The sensor 2100 generates signature data 2210 by signature generation processing 2111 based on RAW data 2200 acquired by a pixel array unit 2110. The sensor 2100 encrypts data obtained by adding the generated signature data 2210 to the RAW data 2200 using, for example, a secret key 2112 in a public key cryptosystem. The encrypted data is output from the sensor 2100 and supplied to the image processing unit 2120. The present disclosure is not limited thereto, and the sensor 2100 can add sensor information 2220 to the encrypted data and supply the data to the image processing unit 2120.

The image processing unit 2120 performs predetermined image processing such as demosaic processing, white balance processing, and image quality enhancement processing on the RAW data included in the supplied data to generate visible image data, performs, for example, predetermined compression encoding processing on the image data to compress a data amount, and outputs the compressed image data as output image data 2230. In the example of FIG. 3A, the output image data 2230 is JPEG data obtained by compressing and encoding image data by a joint photographic experts group (JPEG) system.

Here, when performing the image processing on the RAW data included in the supplied data, the image processing unit 2120 decrypts encryption of the data using a public key 2121 corresponding to the secret key 2112. The RAW data 2200 included in the data input to the image processing unit 2120 can be proved to be data acquired by the sensor 2100 based on the signature data 2210 included in the decrypted data.

However, when the image processing unit 2120 performs image processing on the RAW data 2200 acquired by the sensor 2100 to change the RAW data 2200, the signature data 2210 added to the RAW data 2200 in the sensor 2100 is meaningless.

That is, the signature data added in the sensor 2100 can only prove the authenticity of the RAW data 2200 before the change. Therefore, in the existing technology, it is difficult to perform authenticity proof for determining whether the output image data 2230 output from the image processing unit 2120 has been falsified.

Figure 3B:
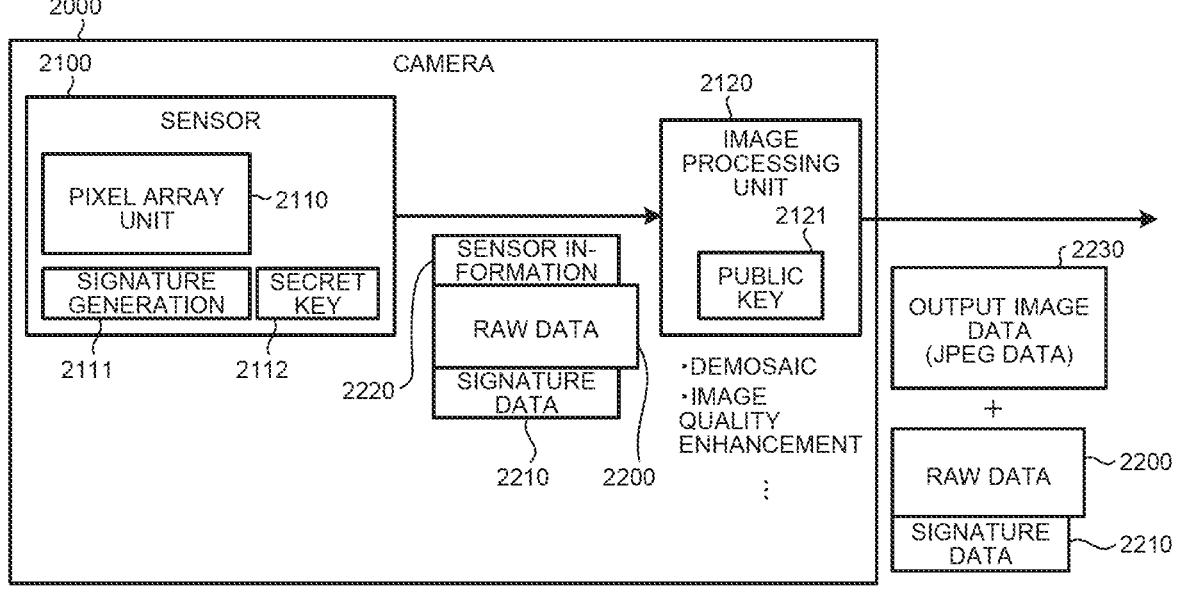
FIG. 3B is a diagram illustrating an example of performing authenticity proof on the output image data in the existing technology.

In the existing technology, in order to prove the authenticity of the output image data 2230 output from the image processing unit 2120, it is conceivable to output the RAW data 2200 to which the signature data 2210 is added together with the output image data 2230, as illustrated in FIG. 3B. The RAW data 2200 can be authenticated based on the signature data 2210. In addition, the output image data 2230 can be authenticated by comparing the same with the image data by the RAW data 2200.

However, the RAW data 2200 generally has a larger data amount than the corresponding output image data 2230, so that a data transfer load increases.

In the present disclosure, the data amount of the RAW data 2200 is compressed, and the signature data 2210 is added to the RAW data 2200. Thereafter, encryption processing is further performed on the RAW data 2200, and the RAW data 2200 is output together with the output image data 2230. As a result, it is possible to reduce the load of data transfer when the output image data 2230 and the RAW data 2200 are output.

2. Technology Applicable to Each Embodiment of Present Disclosure

Figure 4:
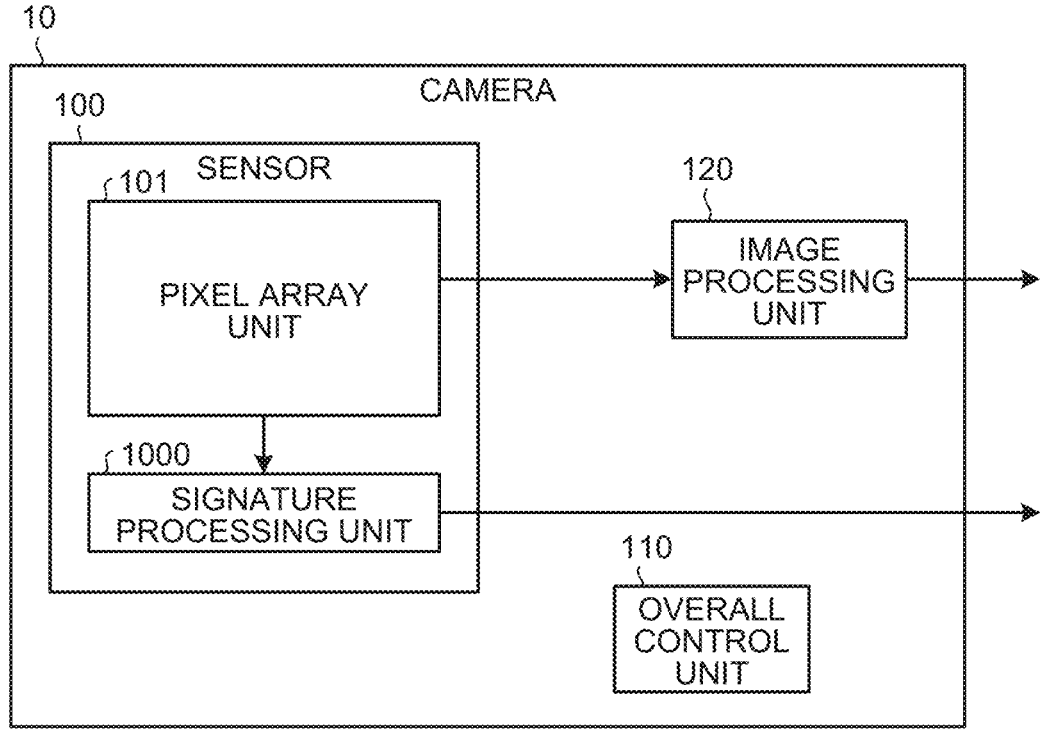
FIG. 4 is a block diagram schematically illustrating a configuration of an example of a camera applicable to each embodiment.

Next, a technology applicable to each embodiment of the present disclosure will be described. FIG. 4 is a block diagram schematically illustrating a configuration of an example of a camera applicable to each embodiment. In FIG. 4, a camera 10 includes a sensor 100, an overall control unit 110, and an image processing unit 120. The overall control unit 110 includes, for example, a central processing unit (CPU) and a memory, and controls the overall operation of the camera 10 according to a program stored in the memory.

The sensor 100 includes a pixel array unit 101 and a signature processing unit 1000. The pixel array unit 101 includes a plurality of pixels arranged in a matrix array, each of the pixels generating a pixel signal corresponding to light received by exposure, and acquires image data based on each of the pixel signals generated by the plurality of pixels. The image data acquired by the pixel array unit 101 is unprocessed RAW data.

The signature processing unit 1000 performs compression processing of a data amount on the RAW data acquired by the pixel array unit 101, and generates signature data based on the RAW data (referred to as compressed RAW data), the data amount of which is compressed. The signature processing unit 1000 encrypts the compressed RAW data and the signature data.

The RAW data acquired by the pixel array unit 101 is supplied to the image processing unit 120 as data for image processing. The image processing unit 120 performs predetermined image processing on the supplied RAW data to generate visible image data. The visible image data generated by the image processing unit 120 is output from the camera 10 together with the compressed RAW data generated and encrypted by the signature processing unit 1000.

(Configuration Example of Pixel Array Unit Applicable to Each Embodiment)

Figure 5:
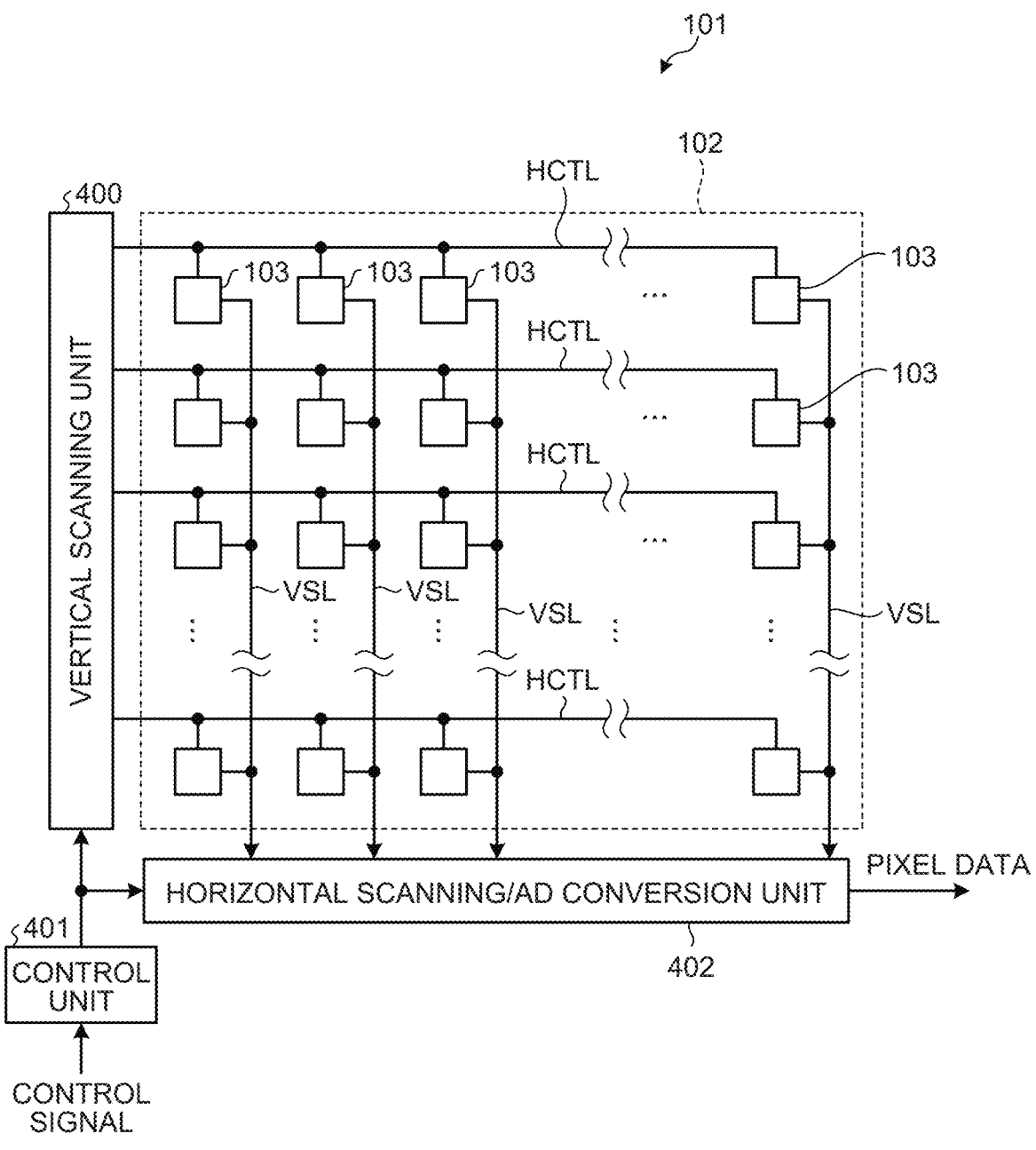
FIG. 5 is a block diagram illustrating a configuration of an example of a pixel array unit applicable to each embodiment.

FIG. 5 is a block diagram illustrating a configuration of an example of the pixel array unit 101 applicable to each embodiment. In FIG. 5, the pixel array unit includes a pixel array 102, a vertical scanning unit 400, a horizontal scanning/AD conversion unit 402, and a control unit 401.

The pixel array 102 includes a plurality of pixels 103, each of the pixels having an imaging element configured to generate a voltage corresponding to received light. As the imaging element, a photodiode can be used. In the pixel array 102, the plurality of pixels 103 are arranged in a matrix in a horizontal direction (row direction) and a vertical direction (column direction). In the pixel array 102, an arrangement of the pixels 103 in the row direction is referred to as a line. An image (image data) of one frame is formed based on pixel signals read from a predetermined number of lines in the pixel array 102. For example, in a case where an image of one frame is formed with 3000 pixels×2000 lines, the pixel array 102 includes at least 2000 lines including at least 3000 pixels 103. In the pixel array 102, a region including the pixels 103 used to form the image of one frame is referred to as an effective pixel region. Further, the image data formed in the pixel array 102 is RAW data.

In addition, in the pixel array 102, with respect to the row and the column of each pixel 103, a pixel signal line HCTL is connected to each row, and a vertical signal line VSL is connected to each column.

An end portion of the pixel signal line HCTL that is not connected to the pixel array 102 is connected to the vertical scanning unit 400. The vertical scanning unit 400 transmits, for example, a plurality of control signals such as a drive pulse at the time of reading a pixel signal from the pixel 103 to the pixel array 102 via the pixel signal line HCTL according to a control signal supplied from the control unit 401. An end portion of the vertical signal line VSL that is not connected to the pixel array 102 is connected to the horizontal scanning/AD conversion unit 402.

The horizontal scanning/AD conversion unit 402 includes an analog to digital (AD) conversion unit, an output unit, and a signal processing unit. The pixel signal read from the pixel 103 is transmitted to the AD conversion unit of the horizontal scanning/AD conversion unit 402 via the vertical signal line VSL.

The reading control of the pixel signal from the pixel 103 will be schematically described. Reading the pixel signal from the pixel 103 is performed by transferring charges accumulated in the imaging element by exposure to a floating diffusion (FD) layer and converting the charges transferred in the floating diffusion layer into a voltage. The voltage obtained by converting the charges in the floating diffusion layer is output to the vertical signal line VSL via an amplifier.

More specifically, in the pixel 103, during exposure, a space between the imaging element and the floating diffusion layer is set to an off (open) state, and charges generated according to light incident by photoelectric conversion are accumulated in the imaging element. After the exposure is completed, the floating diffusion layer and the vertical signal line VSL are connected according to a selection signal supplied via the pixel signal line HCTL. Further, the floating diffusion layer is connected to a supply line of a power supply voltage VDD or a black level voltage in a short period of time according to a reset pulse supplied via the pixel signal line HCTL, and the floating diffusion layer is reset. A voltage (referred to as a voltage P) of a reset level of the floating diffusion layer is output to the vertical signal line VSL. Thereafter, the space between the imaging element and the floating diffusion layer is turned on (closed) by a transfer pulse supplied via the pixel signal line HCTL, and the charges accumulated in the imaging element are transferred to the floating diffusion layer. A voltage (referred to as a voltage Q) corresponding to the charge amount of the floating diffusion layer is output to the vertical signal line VSL.

In the horizontal scanning/AD conversion unit 402, the AD conversion unit includes an AD converter provided for each vertical signal line VSL, and the pixel signal supplied from the pixel 103 via the vertical signal line VSL is subjected to AD conversion processing by the AD converter, and two digital values (values respectively corresponding to the voltage P and the voltage Q) for correlated double sampling (CDS) processing for reducing noise are generated.

The two digital values generated by the AD converter are subjected to CDS processing by the signal processing unit, and a pixel signal (pixel data) by a digital signal is generated. The generated pixel data is output from the pixel array unit.

Under the control of the control unit 401, the horizontal scanning/AD conversion unit 402 performs selective scanning for selecting the AD converters for the respective vertical signal lines VSL in a predetermined order, thereby sequentially outputting the respective digital values temporarily stored in the respective AD converters to the signal processing unit. The horizontal scanning/AD conversion unit 402 implements this operation by a configuration including, for example, a shift register, an address decoder, and the like.

The control unit 401 performs, for example, drive control of the vertical scanning unit 400, the horizontal scanning/AD conversion unit 402, and the like in accordance with a control signal from the overall control unit 16. The control unit 401 generates various drive signals serving as references for operations of the vertical scanning unit 400 and the horizontal scanning/AD conversion unit 402. The control unit 401 generates a control signal that the vertical scanning unit 400 supplies to each pixel 103 via the pixel signal line HCTL based on a vertical synchronization signal or an external trigger signal supplied from the outside (for example, the control unit 401) and a horizontal synchronization signal. The control unit 401 supplies the generated control signal to the vertical scanning unit 400.

Based on the control signal supplied from the control unit 401, the vertical scanning unit 400 supplies various signals including the drive pulse to the pixel signal line HCTL of the selected pixel row of the pixel array 102 to each pixel 103 line by line, and causes each pixel 103 to output the pixel signal to the vertical signal line VSL. The vertical scanning unit 400 is configured using, for example, a shift register, an address decoder, and the like.

The pixel array unit configured as described above is a column AD system complementary metal oxide semiconductor (CMOS) image sensor in which AD converters are arranged for each column.

(Outline of Color Filter Array)

Each pixel 103 can dispose an optical filter configured to selectively transmit light in a predetermined wavelength band. When the wavelength band to be transmitted is a wavelength band in a visible light region, the optical filter is referred to as a color filter. Hereinafter, it is assumed that a plurality of types of optical filters having different characteristics, specifically, color filters of respective wavelength bands of red (R), green (G), and blue (B) forming three primary colors are disposed for each pixel 103. The present disclosure is not limited thereto, and a color filter of each color having a complementary color relationship may be disposed for each pixel 103, or an optical filter configured to selectively transmit light in a wavelength band in an infrared region, or an optical filter configured to transmit light in a whole wavelength band in a visible light region may be used. Hereinafter, unless otherwise specified, these various optical filters will be described as color filters.

Figure 6:
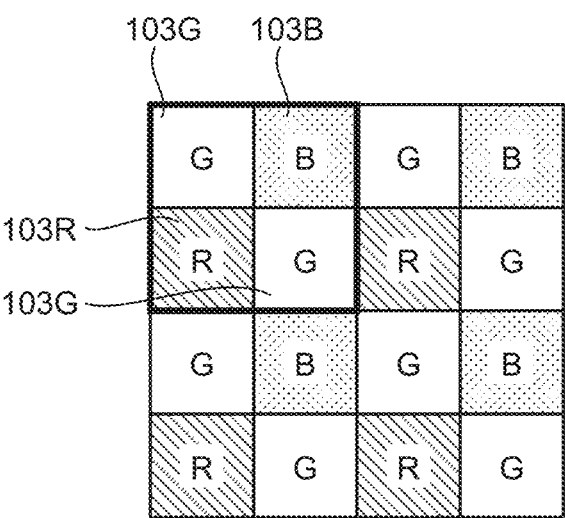
FIG. 6 is a diagram illustrating an example of a commonly used Bayer array.

FIG. 6 is a diagram illustrating an example of a commonly used Bayer array. In FIG. 6, the Bayer array includes two pixels 103G, each of the pixels having a filter of G color disposed therein, one pixel 103R in which a filter of R color is disposed, and a pixel 103B in which a filter of B color is disposed. In the Bayer array, these four pixels are arranged in a lattice of 2 pixels×2 pixels so that the two pixels 103G are not adjacent to each other. In other words, the Bayer array is an array in which the pixels 103, each of the pixels having a color filter disposed therein and configured to transmit light in the same wavelength band, are not adjacent to each other.

Hereinafter, unless otherwise specified, the "pixel 103R in which the color filter of R color is disposed" is referred to as a "pixel 103R of R color" or simply as a "pixel 103R". The same applies to the pixel 103G in which the filter of G color is disposed and the pixel 103B in which the filter B color is disposed. Furthermore, in a case where the color filter is not particularly a problem, each of the pixels 103R, 110G, and 110B will be described as a representative of the pixel 103.

(Structure Example of Pixel Array Unit Applicable to Each Embodiment)

Next, a description will be schematically given as to a structure example of the pixel array unit 101 applicable to each embodiment.

A complementary metal oxide semiconductor (CMOS) image sensor (CIS) in which each unit included in the pixel array unit 101 is integrally formed using a CMOS can be applied to the pixel array unit 101. The pixel array unit 101 can be formed on one substrate. The present disclosure is not limited thereto, and the pixel array unit 101 may be a stacked CIS in which a plurality of semiconductor chips are stacked and formed to be integrated with each other. It is noted that the pixel array unit 101 is not limited to this example, and may be another type of optical sensor such as an infrared light sensor configured to perform imaging with infrared light.

Figure 7A:
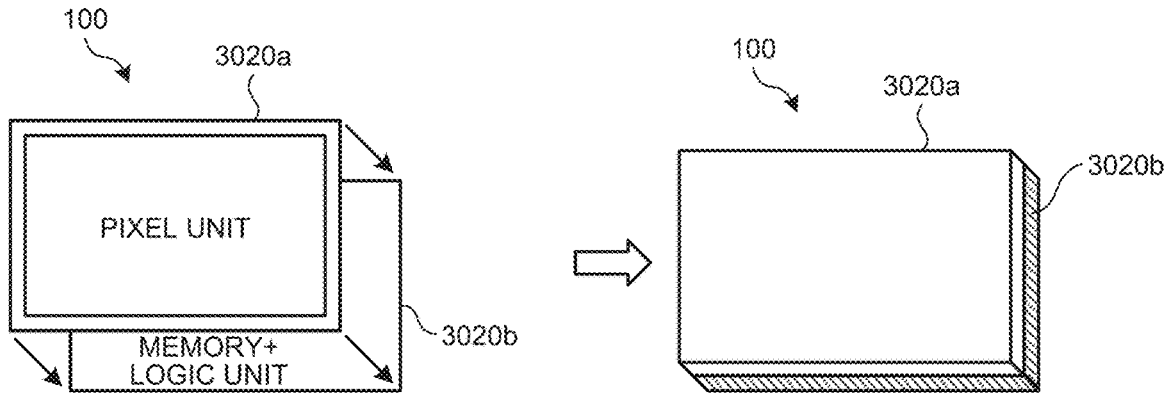
FIG. 7A is a diagram illustrating an example in which the pixel array unit according to each embodiment is formed by a stacked CIS having a two-layer structure.

As an example, the pixel array unit 101 can be formed by a stacked CIS having a two-layer structure in which semiconductor chips are stacked in two layers. FIG. 7A is a diagram illustrating an example in which the pixel array unit 101 according to each embodiment is formed by a stacked CIS having a two-layer structure. In the structure of FIG. 7A, a pixel unit 3020a is formed in a semiconductor chip of a first layer, and a memory+logic unit 3020b is formed in a semiconductor chip of a second layer.

The pixel unit 3020a includes at least the pixel array 102 in the pixel array unit 101. The memory+logic unit 3020b can include, for example, the vertical scanning unit 400, the control unit 401, the horizontal scanning/AD conversion unit 402, and the signature processing unit 1000. The memory+logic unit 3020b can further include a memory that stores image data such as RAW data.

As illustrated on the right side of FIG. 7A, the pixel array unit 101 is configured as one solid-state imaging element by bonding the semiconductor chip of the first layer and the semiconductor chip of the second layer in an electrically contacting manner.

Figure 7B:
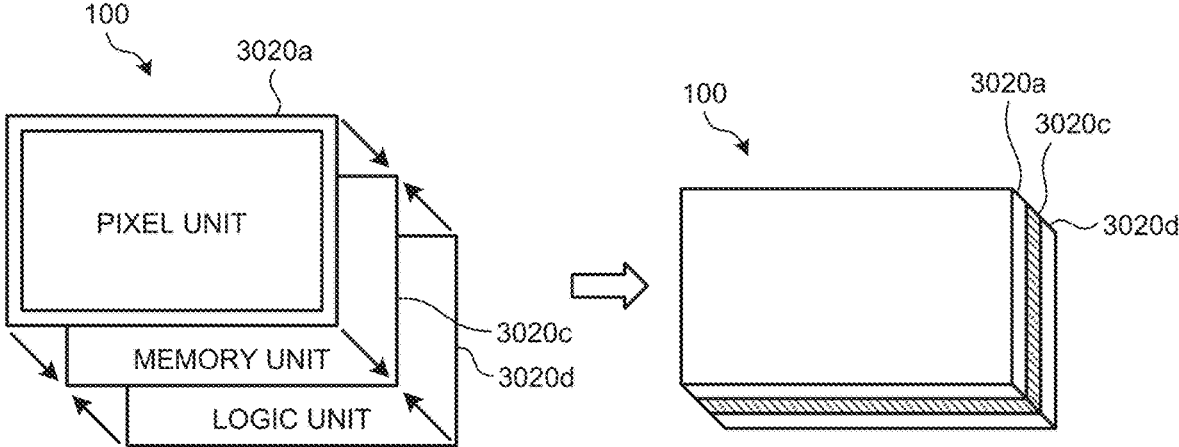
FIG. 7B is a diagram illustrating an example in which the pixel array unit according to each embodiment is formed by a stacked CIS having a three-layer structure.

As another example, the pixel array unit 101 can be formed by a three-layer structure in which three semiconductor chips are stacked. FIG. 7B is a diagram illustrating an example in which the pixel array unit 101 according to each embodiment is formed by a stacked CIS having a three-layer structure. In the structure of FIG. 7B, a pixel unit 3020*a* is formed in a semiconductor chip of a first layer, a memory unit 3020*c* is formed in a semiconductor chip of a second layer, and a logic unit 3020*d* is formed in a semiconductor chip of a third layer. In this case, the logic unit 3020*d* can include, for example, the vertical scanning unit 400, the control unit 401, the horizontal scanning/AD conversion unit 402, and the signature processing unit 1000. Furthermore, the memory unit 3020*c* can include a memory that stores image data such as RAW data.

As illustrated on the right side of FIG. 7B, the pixel array unit 101 is configured as one solid-state imaging element by bonding the semiconductor chip of the first layer, the semiconductor chip of the second layer, and the semiconductor chip of the third layer in an electrically contacting manner.

3. Outline of Each Embodiment of Present Disclosure

Figure 8:
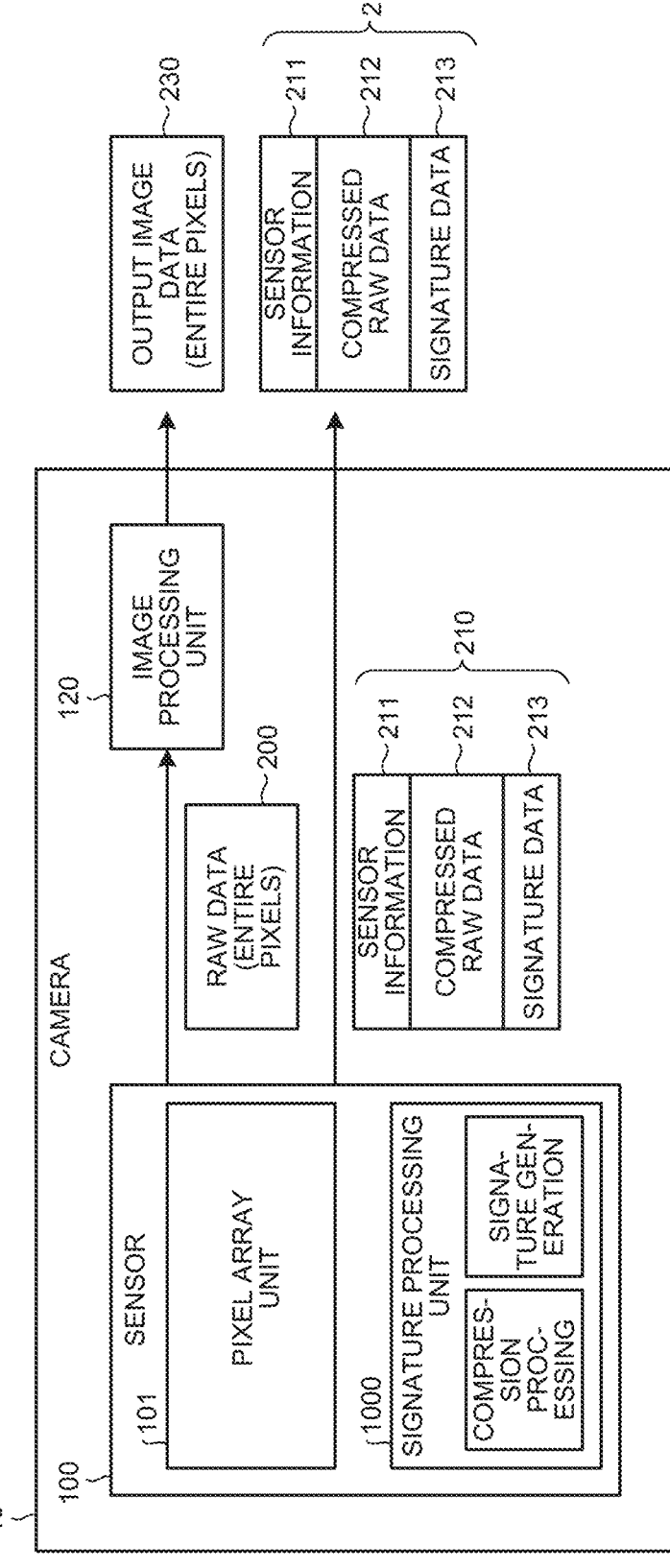
FIG. 8 is a schematic diagram illustrating an outline of each embodiment.

Next, an outline of each embodiment of the present disclosure will be described. FIG. 8 is a schematic diagram illustrating an outline of each embodiment. The configuration illustrated in FIG. 8 corresponds to the configuration described with reference to FIG. 4, and the camera 10 includes the sensor 100 serving as an imaging apparatus according to the present disclosure and the image processing unit 120. Furthermore, the sensor 100 includes the pixel array unit 101 and the signature processing unit 1000. In FIG. 8, the overall control unit 110 is omitted.

The pixel array unit 101 acquires RAW data 200 according to each of the pixel signals generated by a plurality of pixels according to exposure. The RAW data 200 acquired by the pixel array unit 101 is based on each of the pixel signals generated by all the pixels included in the effective pixel region among all the pixels 103 included in the pixel array 102 in the pixel array unit 101.

The sensor 100 supplies the RAW data 200 acquired by the pixel array unit 101 to the image processing unit 120 as data for image processing. The image processing unit 120 performs demosaic processing on the supplied RAW data 200 to generate visible image data. Furthermore, the image processing unit 120 performs image processing such as image quality enhancement processing on the image data generated based on the RAW data, and performs compression encoding processing on the image data subjected to the image processing to generate output image data 230. As a compression encoding method by the image processing unit 120, for example, a JPEG system can be applied.

The signature processing unit 1000 performs data amount compression processing on the RAW data acquired by the pixel array unit 101. The signature processing unit 1000 generates signature data 213 based on the RAW data (compressed RAW data 212), the data amount of which is compressed. For example, the signature processing unit 1000 generates a hash value based on the compressed RAW data 212 and uses the generated hash value as the signature data 213. The signature processing unit 1000 adds the generated signature data 213 to the compressed RAW data 212 to generate authenticity proof data for performing authenticity proof of the output image data 230.

It is noted that the signature processing unit 1000 may acquire sensor information 211 from the sensor 100 and add the acquired sensor information 211 to the signature data 213 and the compressed RAW data 212 to generate authenticity proof data 210. The sensor information 211 can include, for example, identification information (such as a serial number) of the sensor 100, information indicating imaging conditions, and the like. The present disclosure is not limited thereto, and the signature processing unit 1000 may generate the signature data 213 for data obtained by combining the sensor information 211 and the compressed RAW data 212 to generate the authenticity proof data 210. In this manner, by generating the signature data 213 including the sensor information 211, falsification of the sensor information 211 can also be prevented.

The authenticity proof data 210 generated by the signature processing unit 1000 is output to the outside of the camera 10, for example, in association with the output image data 230 generated by the image processing unit 120. The present disclosure is not limited thereto, and the authenticity proof data 210 and the output image data 230 can be stored in association with each other in a nonvolatile storage medium such as a flash memory included in the camera 10.

As described above, according to each embodiment of the present disclosure, the data amount of the RAW data 200 is compressed, and the compressed RAW data, the data amount of which is compressed, is output as the authenticity proof data in association with the compressed image data for visible use. Therefore, the load on the memory in the camera on which the sensor is mounted and the load at the time of data transfer from the camera can be reduced.

Here, the image data for performing image processing in the image processing unit 120 needs to be high-quality data. Therefore, the image processing unit 120 is supplied with the RAW data based on the pixel signals generated by all the pixels 103 included in the effective pixel region in the pixel array 102. On the other hand, in the authenticity proof data 210, it is only required to know that an object or the like is not added or deleted with respect to an image based on original RAW data. Therefore, the compressed RAW data 212, the data amount of which is compressed, can be used as the authenticity proof data 210.

It is noted that, although details will be described later, at the time of proving the authenticity of the output image data 230, the size of the compressed RAW data 212 is converted in accordance with the size of the output image data 230, and the compressed RAW data 212, the size of which is converted, is compared with the output image data 230.

4. First Embodiment of Present Disclosure

Next, a first embodiment of the present disclosure will be described. The first embodiment is an example in which the sensor 100 includes an output terminal configured to output the RAW data 200 for image processing, and an output terminal configured to output the authenticity proof data 210 including the compressed RAW data 212 and the signature data 213.

(4-1. Configuration According to First Embodiment)

Figure 9:
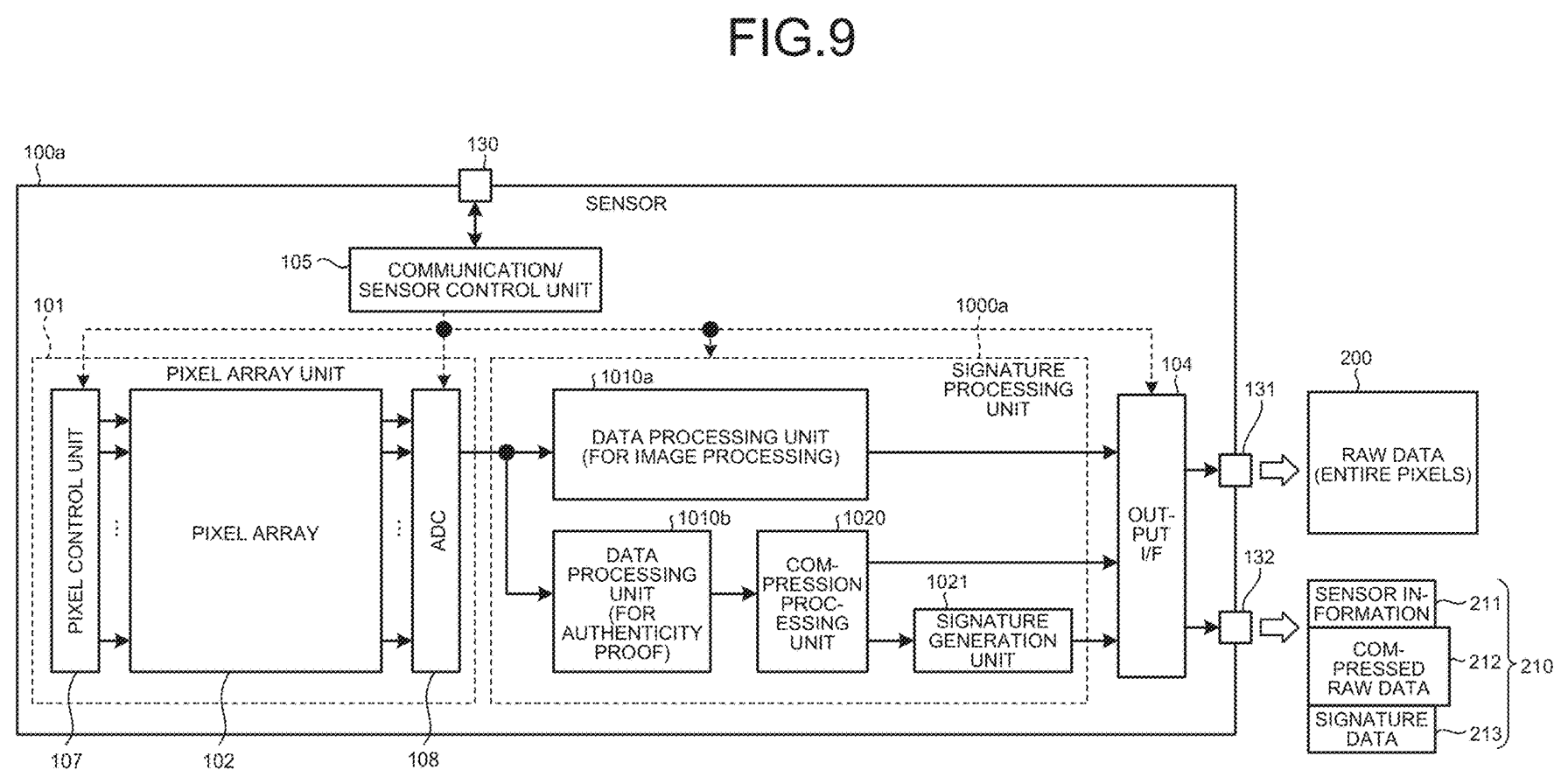

First, a configuration according to the first embodiment will be described. FIG. 9 is a block diagram illustrating a configuration of an example of a sensor according to the first embodiment. In FIG. 9, a sensor 100*a* includes a pixel array unit 101, a signature processing unit 1000*a*, an output interface (I/F) 104, and a communication/sensor control unit 105.

The communication/sensor control unit 105 communicates with an external device such as a host device via a terminal 130. Furthermore, the communication/sensor control unit 105 includes, for example, a processor and a memory, and the processor operates according to a program stored in the memory and controls the overall operation of the sensor 100*a*.

In the example of FIG. 9, the pixel array unit 101 illustrated herein includes a pixel array 102, a pixel control unit 107, and an analog to digital converter (ADC) 108. Among the units, the pixel control unit 107 corresponds to, for example, the vertical scanning unit 400 and the output unit in the horizontal scanning/AD conversion unit 402 illustrated in FIG. 5. Furthermore, the ADC 108 corresponds to the AD conversion unit in the horizontal scanning/AD conversion unit 402 illustrated in FIG. 5.

The signature processing unit 1000*a* includes data processing units 1010*a* and 1010*b*, a compression processing unit 1020, and a signature generation unit 1021. RAW data 200 output from the pixel array unit 101 is input to the data processing units 1010*a* and 1010*b*, respectively. The data processing unit 1010*a* performs predetermined data processing for performing image processing in the image processing unit 120 (not illustrated) in the post-stage on the input RAW data 200. The RAW data 200 subjected to the data processing by the data processing unit 1010*a* is supplied to the output I/F 104.

The data processing unit 1010*b* performs predetermined data processing for generating authenticity proof data 210 on the supplied RAW data 200.

The RAW data 200 subjected to the data processing by the data processing unit 1010*b* is supplied to the compression processing unit 1020. The compression processing unit 1020 performs compression processing (a specific example will be described later) of compressing the data amount on the supplied RAW data 200 to generate compressed RAW data 212. The compression processing unit 1020 supplies the generated compressed RAW data 212 to the output I/F 104 and the signature generation unit 1021.

The signature generation unit 1021 generates signature data 213 based on the supplied compressed RAW data 212. For example, the signature generation unit 1021 generates a hash value from the supplied compressed RAW data 212 and uses the generated hash value as the signature data 213. The present disclosure is not limited thereto, and the signature generation unit 1021 can use a value generated by another algorithm as the signature data 213 as long as the value can uniquely specify the compressed RAW data 212 and is difficult to be estimated. The signature generation unit 1021 supplies the generated signature data 213 to the output I/F 104.

It is noted that the signature generation unit 1021 acquires sensor information 211 from the communication/sensor control unit 105, for example, and further supplies the acquired sensor information 211 to the output I/F 104.

The output I/F 104 includes two interfaces 131 and 132, and two data streams can be output in parallel from the interfaces 131 and 132. As the interfaces 131 and 132, a mobile industry processor interface (MIPI) can be applied. An output unit is configured by including the output I/F 104 and the interfaces 131 and 132.

Specifically, the output I/F 104 outputs the RAW data 200 supplied from the data processing unit 1010*a* via the interface 131 (first output terminal) as it is.

In addition, the output I/F 104 adds the signature data 213 supplied from the signature generation unit 1021 to the compressed RAW data 212 supplied from the compression processing unit 1020. The output I/F 104 outputs the sensor information 211, the compressed RAW data 212, and the signature data 213 via the interface 132 (second output terminal) as the authenticity proof data 210. It is noted that it is also possible to encrypt and output the authenticity proof data 210 using a secret key in a public key cryptosystem.

As described above, the sensor 100*a* according to the first embodiment outputs the RAW data 200 and the authenticity proof data 210 from the different interfaces 131 and 132, respectively. Therefore, the output of the RAW data 200 and the authenticity proof data 210 is prevented from becoming rate-limiting to the frame rate.

(4-2. Data Amount Compression Method Applicable to First Embodiment)

Next, a data amount compression method in the compression processing unit 1020, which is applicable to the first embodiment, will be described.

Figure 10:
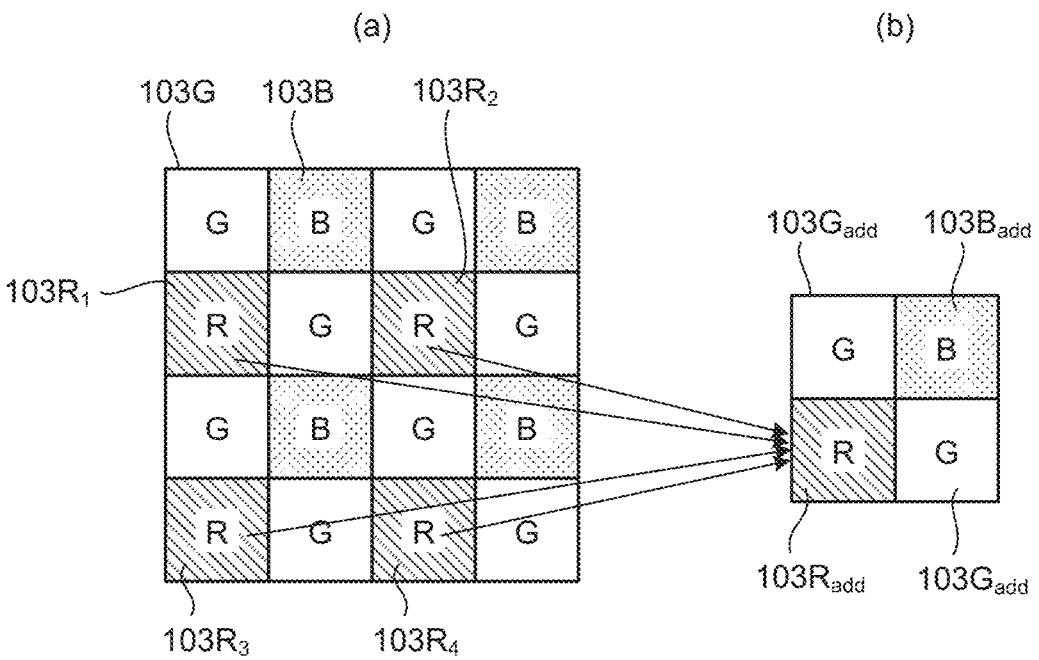
FIG. 10 is a schematic diagram illustrating a first compression method of a data amount, which is applicable to the first embodiment.

FIG. 10 is a schematic diagram illustrating a first compression method of a data amount in the compression processing unit 1020, which is applicable to the first embodiment. In the first compression method, the compression processing unit 1020 obtains an addition average of pixel data for each of a predetermined number of pixels 103 in which color filters of the same color are provided and positions arranged in the array of the pixels 103 of the pixel array 102 are close to each other. The compression processing unit 1020 obtains the addition average of the pixel data of the predetermined number of pixels 103, combines the predetermined number of pixels 103 into one pixel, and generates the compressed RAW data 212 obtained by compressing the data amount of the RAW data 200.

In the example of FIG. 10, in the Bayer array illustrated in a section (a), for example, the compression processing unit 1020 obtains the addition average of the pixel data of pixels 103R₁, 103R₂, 103R₃, and 103R₄ in which red color filters are provided and which are close to each other. The compression processing unit 1020 generates a pixel 103R$_{add}$ having pixel data of a value obtained by adding and averaging the pixel data of the pixel 103R₁ to 103R₄. The compression processing unit 1020 performs similar processing on other pixels 103G and 103B, and generates two pixels 103G$_{add}$ and a pixel 103B$_{add}$. The compressed RAW data 212 is generated by arranging the pixel 103R$_{add}$, the two pixels 103G$_{add}$, and the pixel 103B$_{add}$ according to the Bayer array. The compressed RAW data 212 is data obtained by compressing the data amount of the original RAW data 200 to ¼.

According to the first compression method, the pixel of the compressed RAW data 212 is generated by obtaining the addition average of the pixel data of the pixels in which the color filters having the same color are provided and which are close to each other, so that the data amount of the RAW data 200 can be compressed and noise can be reduced.

Figure 11:
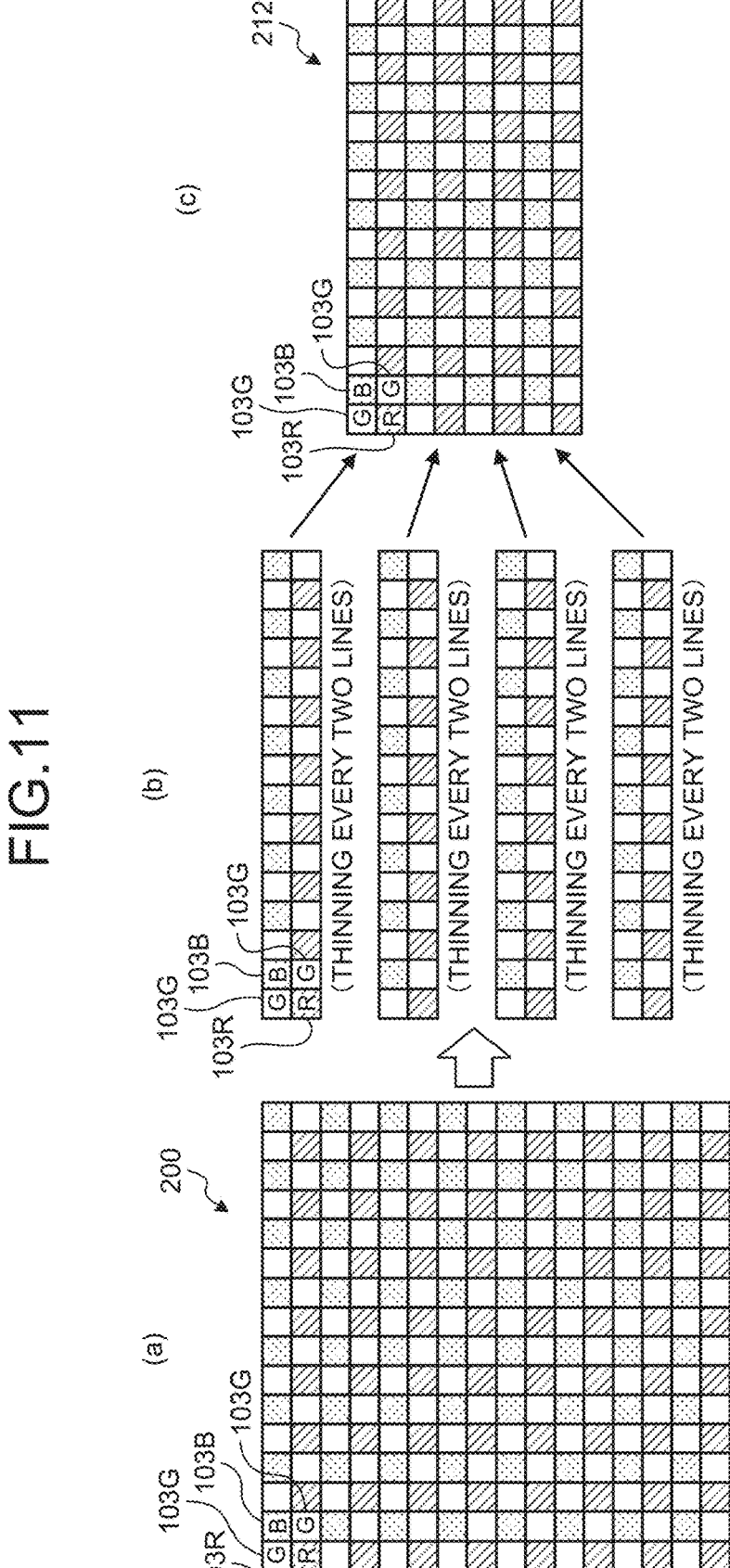
FIG. 11 is a schematic diagram illustrating a second compression method of a data amount, which is applicable to the first embodiment.

FIG. 11 is a schematic diagram illustrating a second compression method of a data amount in the compression processing unit 1020, which is applicable to the first embodiment. In the second compression method, the compression processing unit 1020 generates the compressed RAW data 212 by thinning the RAW data 200 on a pixel-by-pixel basis.

In the example of FIG. 11, the compression processing unit 1020 performs thinning, on a line-by-line basis, on the RAW data 200 illustrated in a section (a), as illustrated in a section (b). At this time, the compression processing unit 1020 performs thinning every two lines according to the repetitive pattern in the column direction by the Bayer array. A section (c) of FIG. 11 illustrates an example in which the thinned rows are packed to configure the compressed RAW data 212. In this example, the compressed RAW data 212 is data obtained by compressing the data amount of the original RAW data 200 to ½.

According to the second compression method, no calculation is required at the time of compressing the data amount of the RAW data 200, and as such, it is possible to reduce the load of the compression processing unit 1020. Furthermore, according to the second compression method, it is also possible to reduce the number of times of AD conversion and the like in the ADC 108.

Figure 12:
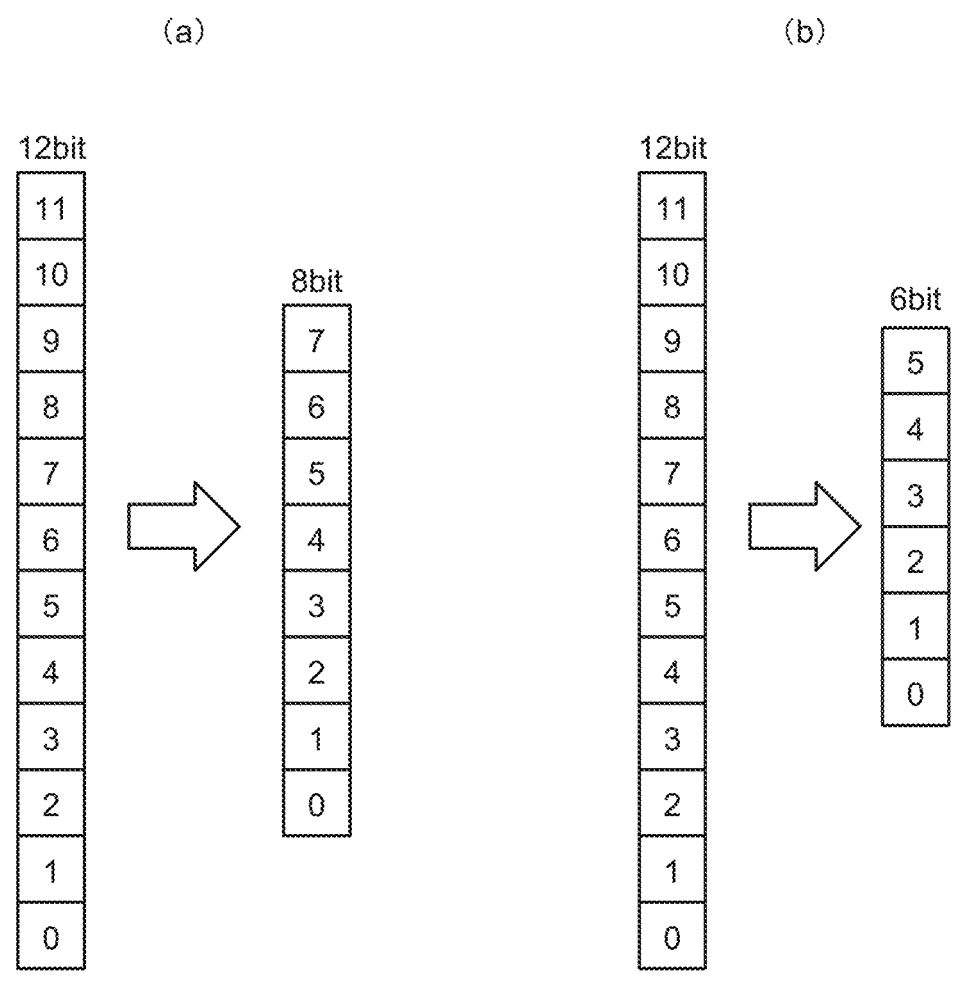
FIG. 12 is a schematic diagram illustrating a third compression method of a data amount, which is applicable to the first embodiment.

FIG. 12 is a schematic diagram illustrating a third compression method of a data amount in the compression processing unit 1020, which is applicable to the first embodiment. In the third compression method, the data amount is compressed for each pixel based on a predetermined compression algorithm. More specifically, the compression processing unit 1020 generates the compressed RAW data 212 by reducing the number of bits of pixel data of each pixel of the RAW data 200 based on a predetermined compression algorithm. The compressed RAW data 212 is data in which the data amount of the RAW data 200 is compressed by an amount by which the number of bits of each pixel data in the RAW data 200 is reduced.

As an example, it is assumed that the number of bits of each pixel data in the RAW data 200 is 12 bits. A section (a) of FIG. 12 illustrates an example in which the number of bits of each piece of pixel data is reduced from 12 bits to 8 bits, and a section (b) illustrates an example in which the number of bits is reduced from 12 bits to 6 bits. In the example of the section (a), the compressed RAW data 212 is data obtained by compressing the data amount of the original RAW data 200 to ⅔. In the example of the section (b), the compressed RAW data 212 is data obtained by compressing the data amount of the original RAW data 200 to ½.

As a method of reducing the number of bits of pixel data, several methods can be considered. As a first method, a method of deleting lower bits of each pixel data in the RAW data 200 is considered. In the example of the section (a) in FIG. 12, the lower 4 bits of the 12-bit pixel data of the RAW data 200 are deleted, and the fourth bit of the pixel data becomes the 0th bit of 8-bit pixel data. In the example in the section (b), the lower 6 bits of the 12 bit pixel data of the RAW data 200 are deleted, and the sixth bit of the pixel data becomes the 0th bit of 6-bit pixel data.

As a second method of reducing the number of bits of pixel data, gradation compression processing is performed on the RAW data 200, and then lower bits are deleted as in the first method described above. As the gradation compression processing, gamma correction processing can be applied. In the first method described above, information of a portion having a small contrast is lost, but this loss of information can be compensated by performing the gradation compression processing.

As a third method of reducing the number of bits of pixel data, a method using continuity of an image is conceivable. In this third method, for example, the number of bits is reduced by sequentially obtaining a difference in pixel data from an adjacent pixel based on a head pixel (a head pixel of a line or the like) according to an array of pixels. As the third method, a compression algorithm defined in a mobile industry processor interface (MIPI) can be applied.

The method of reducing the data amount for each pixel is not limited to the first to third methods described above. It is also possible to combine the first or second method described above with the third method.

Figure 13A:
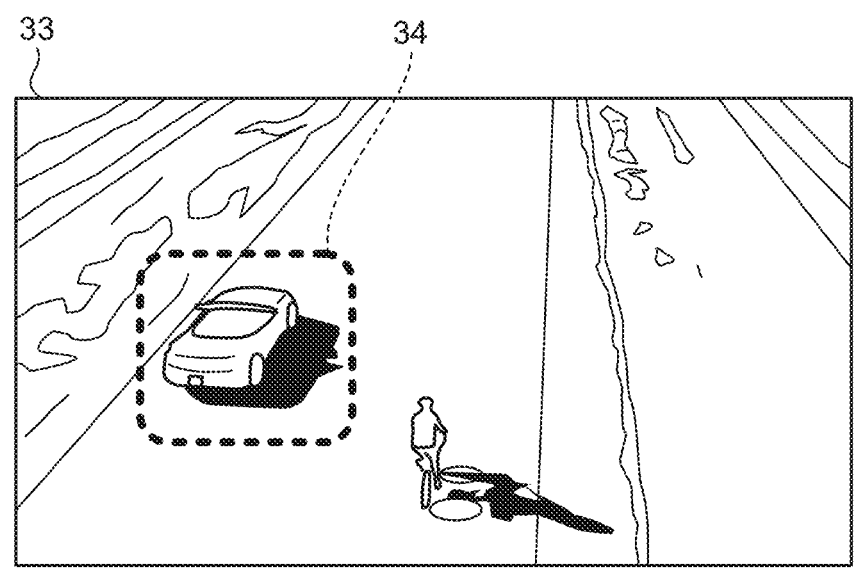
FIG. 13A is a schematic diagram illustrating an example of changing a compression rate of compressed RAW data according to an object of authenticity proof, which is applicable to the first embodiment.
Figure 13B:
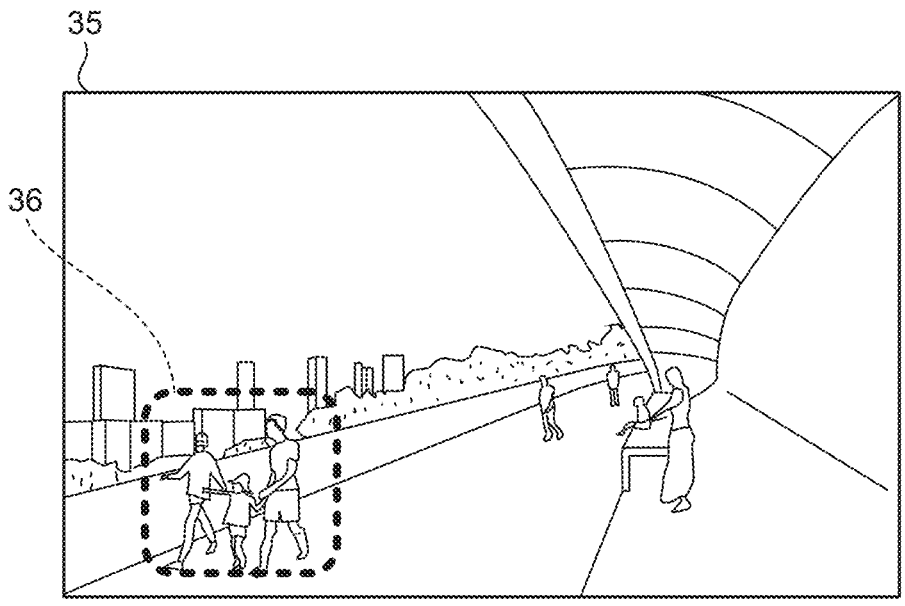
FIG. 13B is a schematic diagram illustrating an example of changing a compression rate of compressed RAW data according to an object of authenticity proof, which is applicable to the first embodiment.

The compression rate of the compressed RAW data 212 can be changed according to an object on which authenticity proof is performed. FIGS. 13A and 13B are schematic diagrams illustrating an example of changing the compression rate of the compressed RAW data 212 according to an object to be authenticated, which is applicable to the first embodiment.

FIG. 13A illustrates an example of determining the presence of absence of deletion or addition of an object 34 included in an image 33 as a target of authenticity proof. In a case where such a large change in the image 33 is detected, the compression rate of the compressed RAW data 212 can be increased. That is, in this case, the data size of the compressed RAW data 212 can be further reduced.

FIG. 13B illustrates an example in which the face of a person 36 included in an image 35 is determined as a target of authenticity proof. For example, in a case where it is desired to prove that the face of the person 36 is authentic (not falsified), compression can be performed only to a size (resolution) that can prove that the face is not falsified. Therefore, in this case, the compression rate of the compressed RAW data 212 is made smaller than that in the case of deleting or adding the object 34 described above.

A specific example of changing the compression rate of the compressed RAW data 212 according to the object of the authenticity proof will be described using the example of the third compression method of the data amount described above. It is conceivable to apply the example illustrated in the section (b) of FIG. 12 in the case of determining the presence or absence of deletion or addition of the object 34 included in the image 33 as the target of the authenticity proof, and to apply the example illustrated in the section (a) of FIG. 12 in the case of determining the face of the person 36.

It is noted that, in the sensor 100a, the compression rate of the compressed RAW data 212 may be fixed, and when authenticity proof of the output image data 230 is externally executed based on the compressed RAW data 212, a level at which falsification can be determined may be presented. The level at which falsification can be determined depends on, for example, whether it is guaranteed that there is no large falsification such as deletion or addition of an object with respect to an image, or whether it is guaranteed that there is the same face as the original RAW data 200 by face authentication or the like. For example, in the authenticity proof data 210, it is conceivable to include information indicating the compression rate of the compressed RAW data 212 in the sensor information 211.

5. Second Embodiment of Present Disclosure

Next, a second embodiment of the present disclosure will be described. In the first embodiment described above, the RAW data 200 and the authenticity proof data 210 are output from the different interfaces 131 and 132. On the other hand, in the second embodiment, the RAW data 200 and the authenticity proof data 210 are output from one interface. At this time, in the second embodiment, the RAW data 200 and the authenticity proof data 210 are output in time division on a line-by-line basis.

Figure 14:
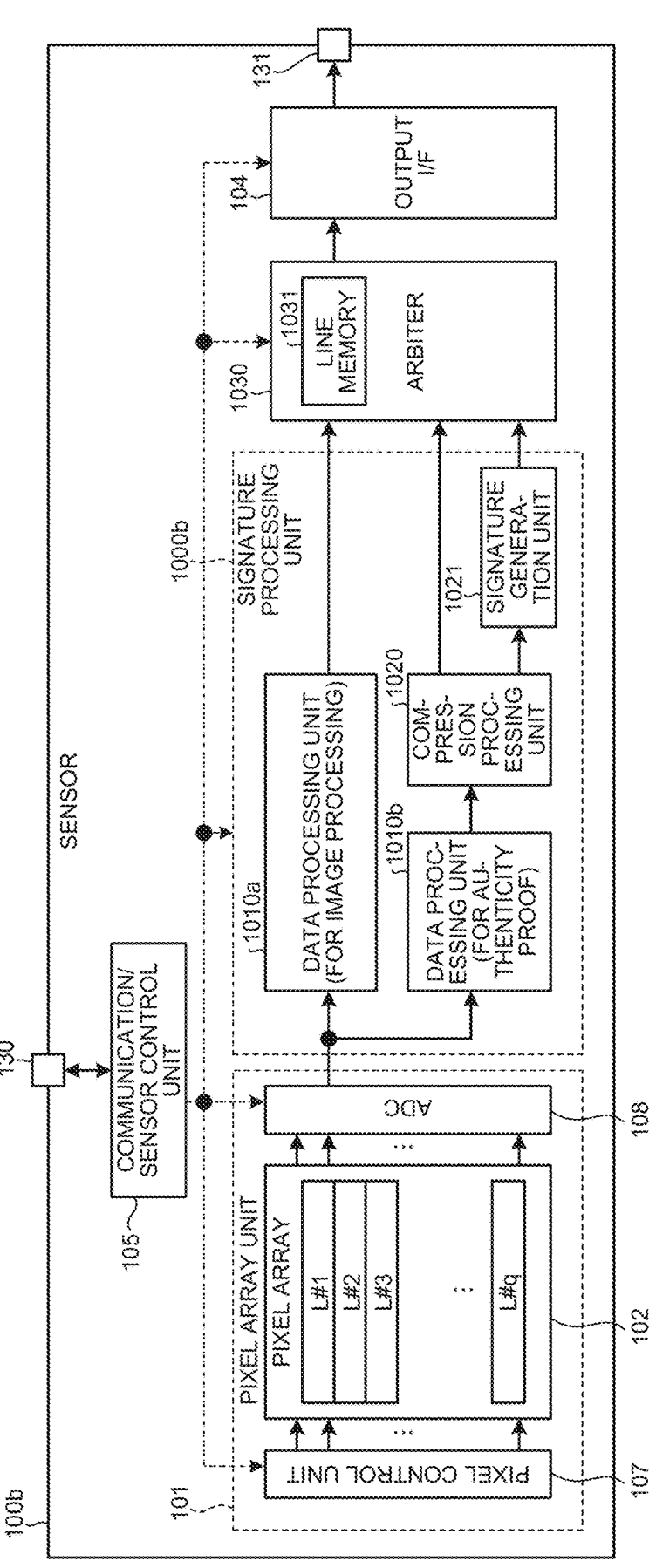
FIG. 14 is a block diagram illustrating a configuration of an example of a sensor according to a second embodiment.

FIG. 14 is a block diagram illustrating a configuration of an example of a sensor according to the second embodiment. In FIG. 14, a sensor 100b has one interface 131 for an output I/F 104 to output data. Furthermore, in the sensor 100b, an arbiter 1030 including a line memory 1031 is inserted between a signature processing unit 1000b and the output I/F 104.

In FIG. 14, lines of a pixel array 102 are illustrated as lines L #1, L #2, . . . , respectively. A pixel array unit 101 sequentially outputs pieces of data of the lines L #1, L #2, . . . from an ADC 108 to data processing units 1010a and 1010*b*. The pieces of data of the lines L #1, L #2, . . . output from the pixel array unit 101 are supplied to the data processing units 1010*a* and 1010*b*, respectively.

The data processing unit 1010*a* performs predetermined data processing on the supplied line data and supplies the line data to the arbiter 1030. The arbiter 1030 stores the line data supplied from the data processing unit 1010*a* in the line memory 1031.

The data processing unit 1010*b* performs predetermined data processing on the supplied line data and supplies the line data to a compression processing unit 1020. The compression processing unit 1020 compresses the amount of data by performing compression processing in the line direction on the supplied line data, and supplies the line data, the data amount of which is compressed, to the arbiter 1030 and a signature generation unit 1021. The signature generation unit 1021 generates signature data 213 based on the supplied line data, and supplies the generated signature data to the arbiter 1030.

The arbiter 1030 arbitrates an output timing by the line data based on the RAW data supplied from the data processing unit 1010*b* and stored in the line memory 1031, the line data compressed in the line direction and supplied from the compression processing unit 1020, and the signature data supplied from the signature generation unit 1021. The arbiter 1030 sequentially outputs the line data based on the RAW data stored in the line memory 1031. At the same time, the arbiter 1030 outputs the signature data and the compressed line data of the plurality of lines according to the output timing of each predetermined line of the line data based on the RAW data.

Each piece of the data output from the arbiter 1030 is supplied to the output I/F 104 and output from the interface 131.

Figure 15:
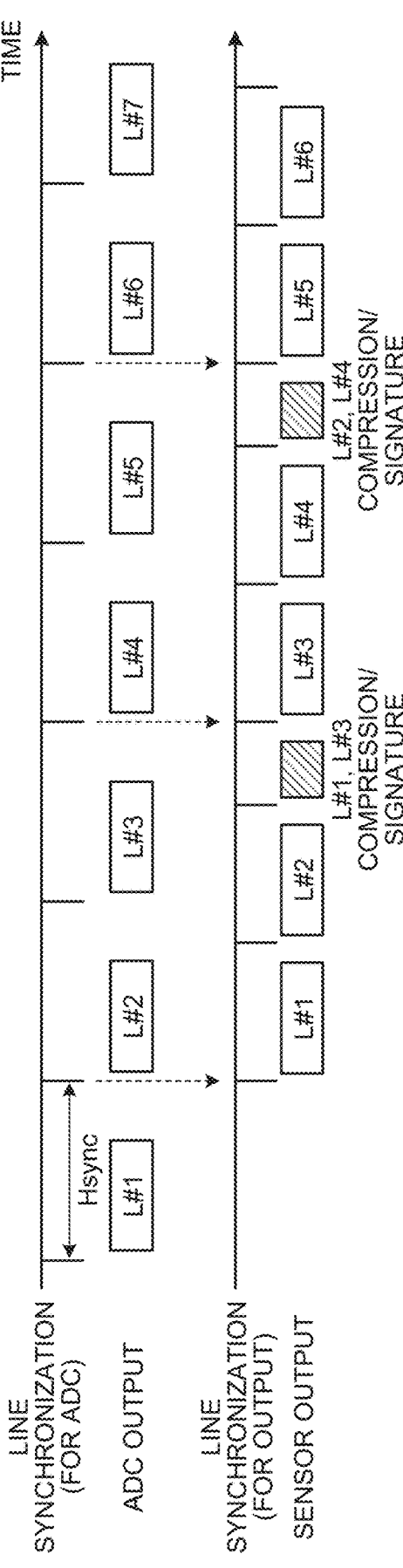
FIG. 15 is a sequence chart illustrating an example of data output processing according to the second embodiment.

FIG. 15 is a sequence chart illustrating an example of data output processing according to the second embodiment. FIG. 15 illustrates, from the top, a line synchronization signal related to the output of the ADC 108, line data output from the ADC 108, a line synchronization signal related to the output of the arbiter 1030 (output I/F 104), and each data output from the sensor 100*b* (arbiter 1030). In the line synchronization signal related to the output of the ADC 108, the synchronization cycle corresponds to the cycle of a horizontal synchronization signal Hsync in the pixel array unit 101.

The line data L #1, L #2, . . . are sequentially output from the ADC 108 for each horizontal synchronization signal Hsync. Each of the line data L #1, L #2, . . . is output in a time shorter than the cycle of the line synchronization signal related to the output of the ADC 108. For example, the line data L #1 output from the ADC 108 is supplied to the arbiter 1030 via the data processing unit 1010*a* and stored in the line memory 1031. When the next line data L #2 is output from the ADC 108, the arbiter 1030 reads the line data L #1 from the line memory 1031 according to the output line synchronization signal, supplies the line data L #1 to the output I/F 104, and stores the line data L #2 in the line memory 1031.

When the next line data L #3 is output from the ADC 108, the arbiter 1030 reads the line data L #2 from the line memory 1031 according to the output line synchronization signal and supplies the line data L #2 to the output I/F 104.

The compression processing unit 1020 respectively compresses the line data L #3 supplied from the ADC 108 and the line data L #1 already supplied from the ADC 108 in the horizontal direction, and supplies the compressed line data L #1 and L #3 to the arbiter 1030 and the signature generation unit 1021. The signature generation unit 1021 generates the signature data 213 of each of the line data L #1 and L #3 based on the compressed and supplied line data L #1 and L #3. The arbiter 1030 supplies, to the output I/F 104, the compressed line data L #1 and L #3 supplied from the compression processing unit 1020 and the signature data 213 generated based on the line data L #1 and L #3 and supplied from the signature generation unit 1021 according to the output line synchronization signal as authenticity proof data 210 related to the line data L #1 and L #3.

Here, the output line synchronization signal is set so as to output line data of two lines by RAW data, signature data of two lines, and compressed line data in the period of two lines of the line synchronization signal related to the output of the ADC 108. As described above, the sensor 100*b* according to the second embodiment sets the line synchronization signal related to the output of the ADC 108 and the output line synchronization signal, and the arbiter 1030 arbitrates the output timings of the line data for two lines of RAW data, the signature data for two lines, and the compressed line data.

As a result, the sensor 100*b* according to the second embodiment can output RAW data and authenticity proof data from one interface 131. Furthermore, the sensor 100*b* according to the second embodiment can generate signature data from the same data as the output RAW data without using a frame memory.

It is noted that, in the configuration of the second embodiment, since the output control becomes complicated, there is a possibility that the operation of the sensor 100*b* becomes output band limiting.

6. Third Embodiment of Present Disclosure

Next, a third embodiment of the present disclosure will be described. The third embodiment of the present disclosure is an example in which a sensor includes a frame memory, and the RAW data 200 and the authenticity proof data 210 are output from one interface using the frame memory.

Figure 16:
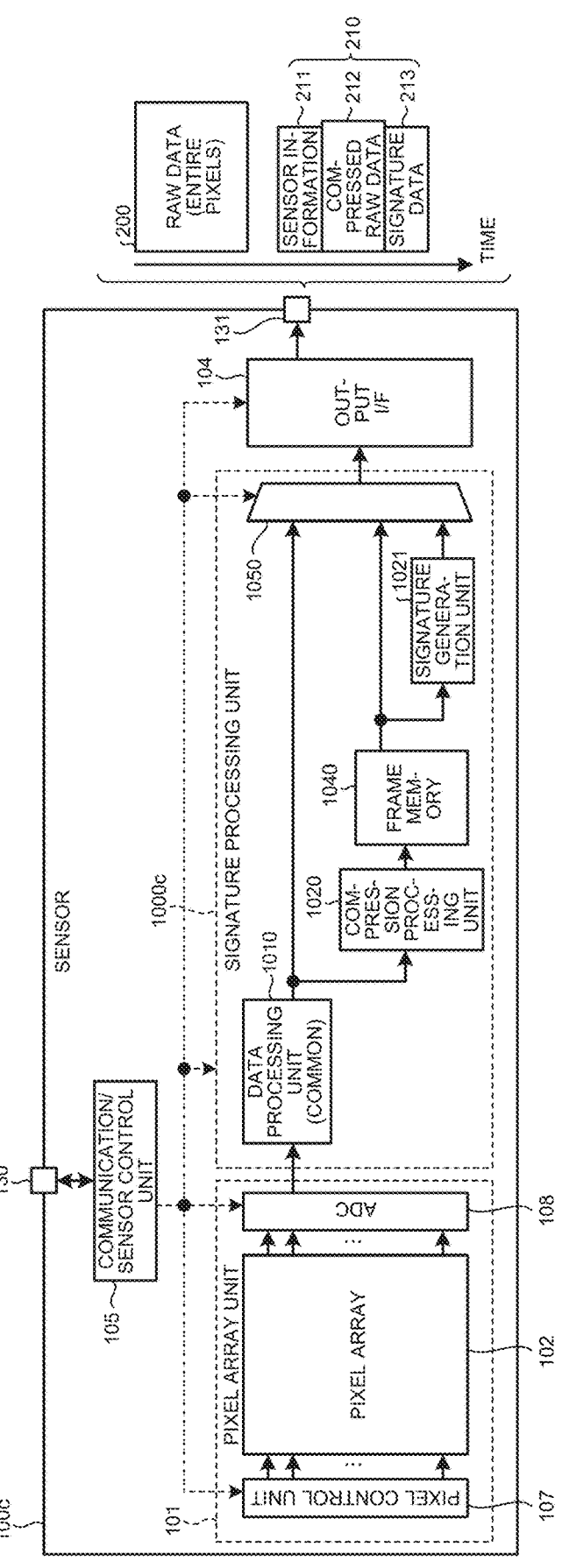
FIG. 16 is a block diagram illustrating a configuration of an example of a sensor according to a third embodiment.

FIG. 16 is a block diagram illustrating a configuration of an example of a sensor according to the third embodiment. In FIG. 16, a sensor 100*c* has one interface 131 for an output I/F 104 to output data. Furthermore, in the sensor 100*c*, a frame memory 1040 is inserted immediately after a compression processing unit 1020 in a signature processing unit 1000*c*, and a selector 1050 is provided in an output unit of the signature processing unit 1000*c*. Furthermore, in the sensor 100*c*, the signature processing unit 1000*c* has a data processing unit 1010 configured to perform predetermined data processing on RAW data 200 supplied from a pixel array unit 101 in common for both the RAW data 200 for output and the RAW data 200 for generating authenticity proof data 210.

In FIG. 16, the RAW data 200 output from the pixel array unit 101 is subjected to predetermined data processing in the data processing unit 1010, and is supplied to the selector 1050 and the compression processing unit 1020. The compression processing unit 1020 performs compression processing of compressing the data amount on the supplied RAW data 200 to generate compressed RAW data 212. The compression processing unit 1020 stores the generated compressed RAW data 212 in the frame memory 1040. The frame memory 1040 only needs to have a capacity capable of storing the compressed RAW data 212 of at least one frame.

The compressed RAW data 212 read from the frame memory 1040 is supplied to the selector 1050 and a signature generation unit 1021. The signature generation unit 1021 generates signature data 213 based on the supplied compressed RAW data 212, and supplies the generated signature data 213 to the selector 1050.

Under the control of a communication/sensor control unit 105, the selector 1050 selects data to be output from among the RAW data 200 supplied from the data processing unit 1010, the compressed RAW data 212 supplied from the frame memory 1040, and the signature data 213 supplied from the signature generation unit 1021, and supplies the selected data to the output I/F 104.

For example, the selector 1050 first selects the RAW data 200 supplied from the data processing unit 1010, and supplies the RAW data 200 for one frame to the output I/F 104. The output I/F 104 outputs the supplied RAW data 200 for one frame from the interface 131.

Next, the selector 1050 selects, for example, the compressed RAW data 212 supplied from the frame memory 1040 and supplies the compressed RAW data to the output I/F 104, and further supplies the signature data 213 supplied from the signature generation unit 1021 to the output I/F 104. The output I/F 104 collectively outputs the compressed RAW data 212, the signature data 213, and sensor information 211 acquired from the communication/sensor control unit 105, for example, as the authenticity proof data 210 from the interface 131.

As described above, while the sensor 100c according to the third embodiment requires the frame memory 1040, the output control becomes simple.

7. Fourth Embodiment of Present Disclosure

Next, a fourth embodiment of the present disclosure will be described. The fourth embodiment of the present disclosure is an example in which a sensor includes a frame memory, and RAW data 200 and authenticity proof data 210 are output from one interface using the frame memory. The fourth embodiment is different from the above-described third embodiment in that the frame memory is placed in front of the data processing unit 1010.

Figure 17:
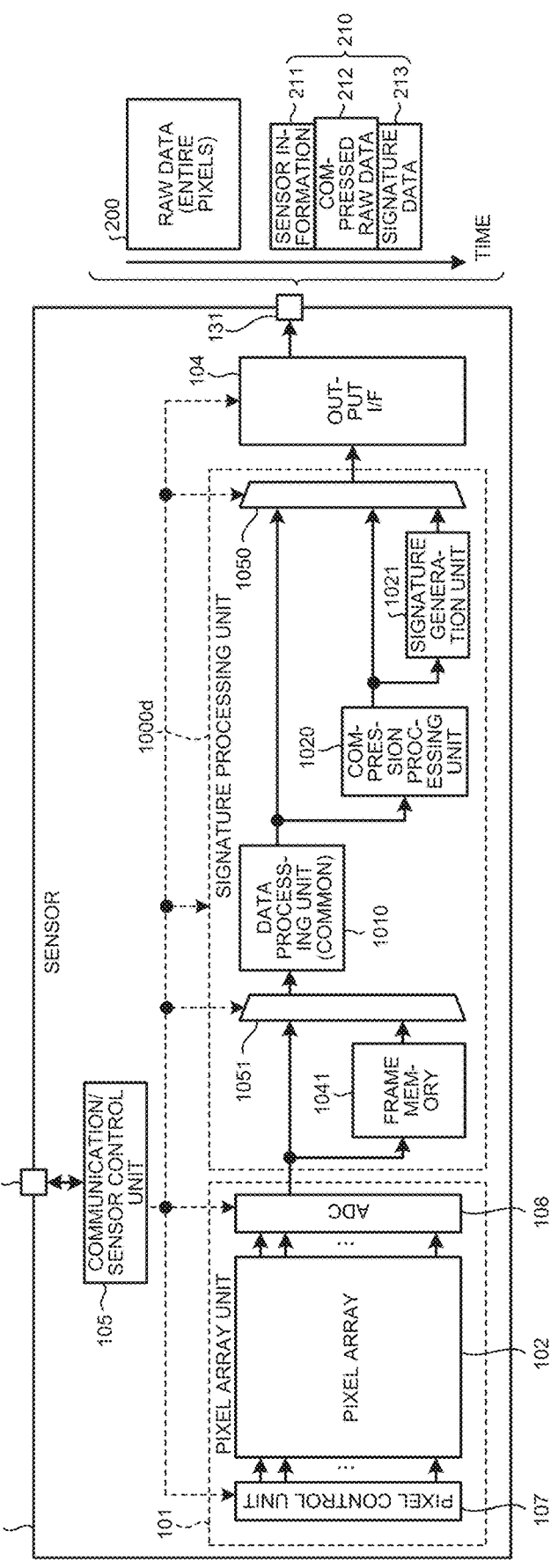
FIG. 17 is a block diagram illustrating a configuration of an example of a sensor according to a fourth embodiment.

FIG. 17 is a block diagram illustrating a configuration of an example of a sensor according to the fourth embodiment. In FIG. 17, a sensor 100d includes one interface 131 for an output I/F 104 to output data, similarly to the sensor 100c illustrated in FIG. 16. On the other hand, in the sensor 100d, a frame memory 1041 and a selector 1051 are provided on the input side of a data processing unit 1010 in a signature processing unit 1000d.

RAW data 200 output from a pixel array unit 101 is supplied to the selector 1051 and stored in the frame memory 1041. Under the control of a communication/sensor control unit 105, the selector 1051 selects the RAW data 200 to be output from the RAW data 200 output from the pixel array unit 101 and the RAW data 200 read from the frame memory 1041, and supplies the selected RAW data 200 to the data processing unit 1010. The data processing unit 1010 performs predetermined data processing on the supplied RAW data 200 and supplies the processed RAW data 200 to a selector 1050 and a compression processing unit 1020.

The compression processing unit 1020 performs compression processing of compressing the data amount on the supplied RAW data 200 to generate compressed RAW data 212. The compression processing unit 1020 supplies the generated compressed RAW data 212 to the selector 1050 and a signature generation unit 1021. The signature generation unit 1021 generates signature data 213 based on the supplied compressed RAW data 212, and supplies the generated signature data 213 to the selector 1050.

Under the control of the communication/sensor control unit 105, the selector 1050 selects data to be output from among the RAW data 200 supplied from the data processing unit 1010, the compressed RAW data 212 supplied from the frame memory 1040, and the signature data 213 supplied from the signature generation unit 1021, and supplies the selected data to the output I/F 104.

For example, the selector 1050 first selects the RAW data 200 supplied from the data processing unit 1010, and supplies the RAW data 200 for one frame to the output I/F 104. The output I/F 104 outputs the supplied RAW data 200 for one frame from the interface 131.

Next, the selector 1050 selects, for example, the compressed RAW data 212 supplied from the frame memory 1040 and supplies the compressed RAW data 212 to the output I/F 104, and further supplies the signature data 213 supplied from the signature generation unit 1021 to the output I/F 104. The output I/F 104 collectively outputs the compressed RAW data 212, the signature data 213, and sensor information 211 acquired from the communication/sensor control unit 105, for example, as the authenticity proof data 210 from the interface 131.

Here, in a case where the data amount compression processing by the compression processing unit 1020 and the generation processing of the signature data 213 by the signature generation unit 1021 are performed, the selector 1051 selects the RAW data 200 read from the frame memory 1041 under the control of the communication/sensor control unit 105. Furthermore, in response to the selection by the selector 1051, the selector 1050 selects the output of the compression processing unit 1020 and further selects the output of the signature generation unit 1021 under the control of the communication/sensor control unit 105.

On the other hand, in a case where the output of the data processing unit 1010 is selected in the selector 1050, the selector 1051 selects the output of the pixel array unit 101 under the control of the communication/sensor control unit 105.

It is noted that, in the example of FIG. 17, the frame memory 1041 is provided for the signature processing unit 1000d, but the present disclosure is not limited to this example. For example, in a case where a frame memory is provided for other processing in the pixel array unit 101, this frame memory may be used for the purpose of the frame memory 1041. For example, in the configuration of the pseudo global shutter, a frame memory for storing each pixel data read at a high speed in the pixel array unit 101 is provided, and the pixel data may be read from the frame memory over, for example, one frame cycle. The frame memory in the pseudo global shutter can be used for the purpose of the frame memory 1041.

8. Fifth Embodiment of Present Disclosure

Next, a fifth embodiment of the present disclosure will be described. The fifth embodiment is an example in which reading of the RAW data 200 for the output from the pixel array unit 101 and reading of the RAW data 200 for the authenticity proof data 210 are executed at different timings. At this time, the fifth embodiment is an example in which a voltage holding type pixel is used as each pixel 103 included in the pixel array unit 101. Since the voltage holding type pixel holds a pixel signal generated by exposure, the pixel signal generated by one exposure can be read a plurality of times.

(8-1. Configuration Example of Pixel)

Figure 18:
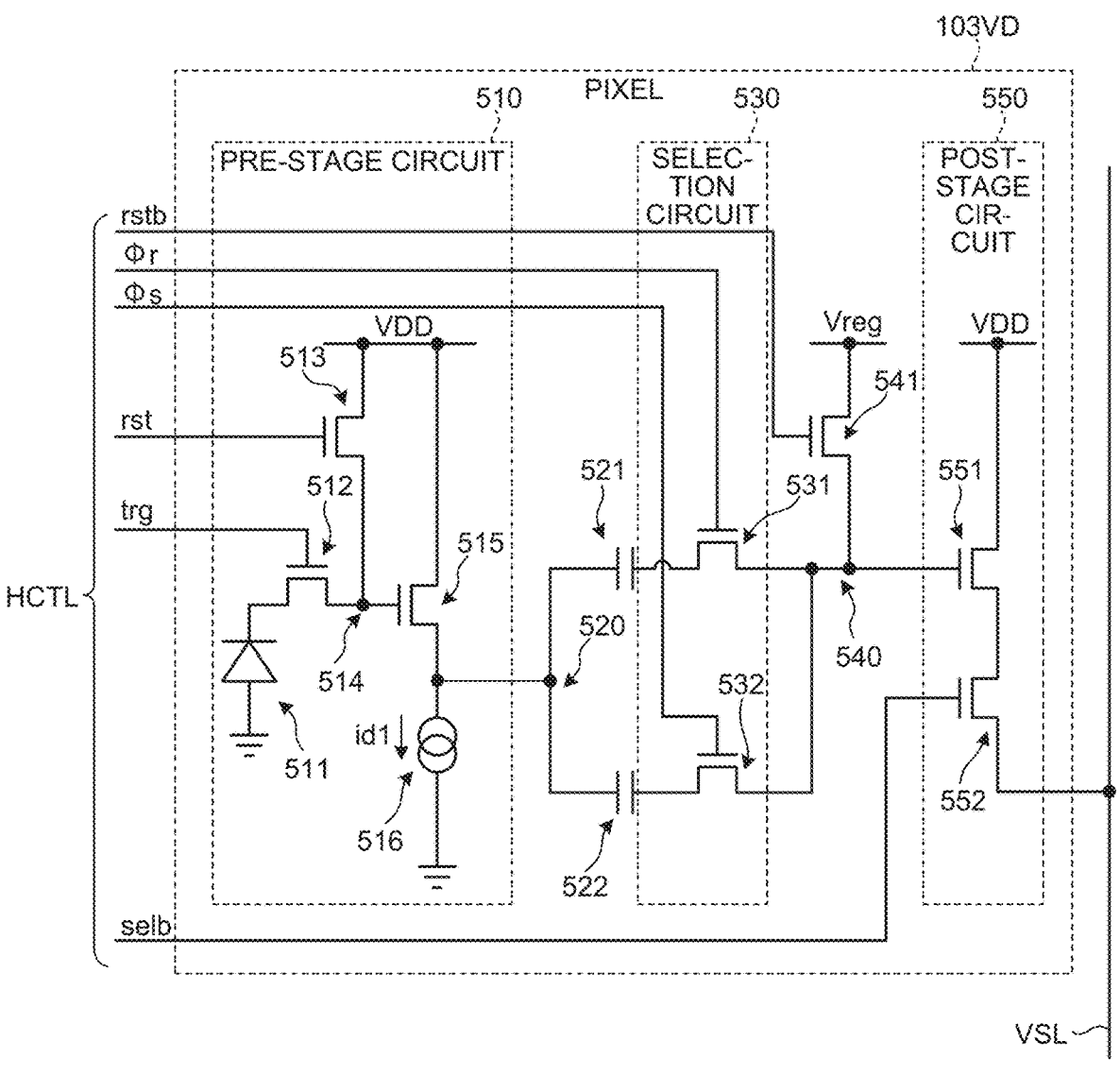
FIG. 18 is a circuit diagram illustrating a configuration of an example of a voltage holding type pixel applicable to a fifth embodiment.

FIG. 18 is a circuit diagram illustrating a configuration of an example of a voltage holding type pixel 103VD applicable to the fifth embodiment. In FIG. 18, the pixel 103VD includes a pre-stage circuit 510, capacitive elements 521 and 322, a selection circuit 530, a post-stage reset transistor 541, and a post-stage circuit 550.

The pre-stage circuit 510 includes a photoelectric conversion element 511, a transfer transistor 512, a floating diffusion (FD) reset transistor 513, an FD 514, a pre-stage amplification transistor 515, and a current source transistor 516.

The photoelectric conversion element 511 generates a charge by photoelectric conversion. The transfer transistor 512 transfers the charge from the photoelectric conversion element 511 to the FD 514 in accordance with a transfer signal trg from the vertical scanning unit 400.

The FD reset transistor 513 extracts and initializes the charges from the FD 514 in accordance with an FD reset signal rst from the vertical scanning unit 400. The FD 514 accumulates the charges and generates a voltage corresponding to the charge amount. The pre-stage amplification transistor 515 amplifies the level of the voltage of the FD 514 and outputs the amplified voltage to a pre-stage node 520.

Furthermore, the drains of the FD reset transistor 513 and the pre-stage amplification transistor 515 are connected to a power supply voltage VDD. The current source transistor 516 is connected to the source of the pre-stage amplification transistor 515. The current source transistor 516 supplies a current id1 under the control of the vertical scanning unit 400.

One end of each of the capacitive elements 521 and 522 is commonly connected to the pre-stage node 520, and the other end thereof is connected to the selection circuit 530.

The selection circuit 530 includes a selection transistor 531 and a selection transistor 532. The selection transistor 531 opens and closes a path between the capacitive element 521 and a post-stage node 540 in accordance with a selection signal $\Phi_r$ from the vertical scanning unit 400. The selection transistor 532 opens and closes a path between the capacitive element 522 and the post-stage node 540 in accordance with a selection signal $\Phi_s$ from the vertical scanning unit 400.

The post-stage reset transistor 541 initializes the level of the post-stage node 540 to a predetermined potential Vreg in accordance with a post-stage reset signal rstb from the vertical scanning unit 400. A potential (for example, a potential lower than VDD) different from the power supply potential VDD is set as the potential Vreg.

The post-stage circuit 550 includes a post-stage amplification transistor 551 and a post-stage selection transistor 552. The post-stage amplification transistor 551 amplifies the level of the post-stage node 540. The post-stage selection transistor 552 outputs a signal at a level amplified by the post-stage amplification transistor 551 to a vertical signal line VSL as a pixel signal in accordance with a post-stage selection signal selb from the vertical scanning unit 400.

It is noted that, for example, an n-channel metal oxide semiconductor (nMOS) transistor is used as various transistors (transfer transistor 512 and the like) in the pixel 103VD.

The vertical scanning unit 400 supplies a high-level FD reset signal rst and a high-level transfer signal trg to all the pixels at the start of exposure. As a result, the photoelectric conversion element 511 is initialized. Hereinafter, this control is referred to as "PD reset".

Then, the vertical scanning unit 400 supplies the high-level FD reset signal rst over the pulse period while setting the post-stage reset signal rstb and the selection signal $\Phi_r$ to the high level for all the pixels immediately before the end of the exposure. As a result, the FD 514 is initialized, and a level corresponding to the level of the FD 514 at that time is held in the capacitive element 521. This control is hereinafter referred to as "FD reset".

The level of the FD 514 at the time of the FD reset and a level (holding level of the capacitive element 521 and level of the vertical signal line VSL) corresponding to the level are hereinafter collectively referred to as a "P phase" or a "reset level".

At the end of the exposure, the vertical scanning unit 400 supplies the high-level transfer signal trg over the pulse period while setting the post-stage reset signal rstb and the selection signal $\Phi_s$ to the high level for all the pixels. As a result, a signal charge corresponding to the exposure amount is transferred to the FD 514, and a level corresponding to the level of the FD 514 at that time is held in the capacitive element 522.

The level of the FD 514 at the time of signal charge transfer and a level (holding level of the capacitive element 522 and level of the vertical signal line VSL) corresponding to the level are hereinafter collectively referred to as a "D phase" or a "signal level".

The exposure control of simultaneously starting and ending the exposure for all the pixels in this manner is referred to as a global shutter system. By this exposure control, the pre-stage circuit 510 of all the pixels sequentially generates the reset level and the signal level. The reset level is held in the capacitive element 521, and the signal level is held in the capacitive element 522.

After the exposure is finished, the vertical scanning unit 400 sequentially selects a row and sequentially outputs a reset level and a signal level of the row. When outputting the reset level, the vertical scanning unit 400 supplies the high-level selection signal $\Phi_r$ over a predetermined period while keeping the FD reset signal rst and the post-stage selection signal selb of the selected row at the high level. As a result, the capacitive element 521 is connected to the post-stage node 540, and the reset level is read.

After reading the reset level, the vertical scanning unit 400 supplies the high-level post-stage reset signal rstb over the pulse period while keeping the FD reset signal rst and the post-stage selection signal selb of the selected row at the high level. As a result, the level of the post-stage node 540 is initialized. At this time, both the selection transistor 531 and the selection transistor 532 are in the open state, and the capacitive elements 521 and 522 are disconnected from the post-stage node 540.

After the initialization of the post-stage node 540, the vertical scanning unit 400 supplies the high-level selection signal $\Phi_S$ over a predetermined period while keeping the FD reset signal rst and the post-stage selection signal selb of the selected row at the high level. As a result, the capacitive element 522 is connected to the post-stage node 540, and the signal level is read.

By the above-described read control, the selection circuit 530 of the selected row sequentially performs a control operation to connect the capacitive element 521 to the post-stage node 540, a control operation to separate the capacitive elements 521 and 322 from the post-stage node 540, and a control operation to connect the capacitive element 522 to the post-stage node 540. In addition, when the capacitive elements 521 and 322 are disconnected from the post-stage node 540, the post-stage reset transistor 541 of the selected row initializes the level of the post-stage node 540. In addition, the post-stage circuit 550 of the selected row sequentially reads the reset level and the signal level from the capacitive elements 521 and 522 via the post-stage node 540, and outputs the reset level and the signal level to the vertical signal line VSL. The pixel signal can be acquired based on a difference between the signal level and the reset level.

As described above, in the voltage holding type pixel 103VD, the reset level and the signal level are held in the capacitive elements 521 and 522. Therefore, the pixel 103VD can read the reset level and the signal level from the capacitive elements 521 and 522 a plurality of times, and can acquire each pixel signal. It is noted that, since the pixel signal is generated based on the reset level and the signal level held in the capacitive elements 521 and 522, it can be regarded that the pixel signal is held in the pixel 103VD.

(8-2. Configuration According to Fifth Embodiment)

Figure 19:
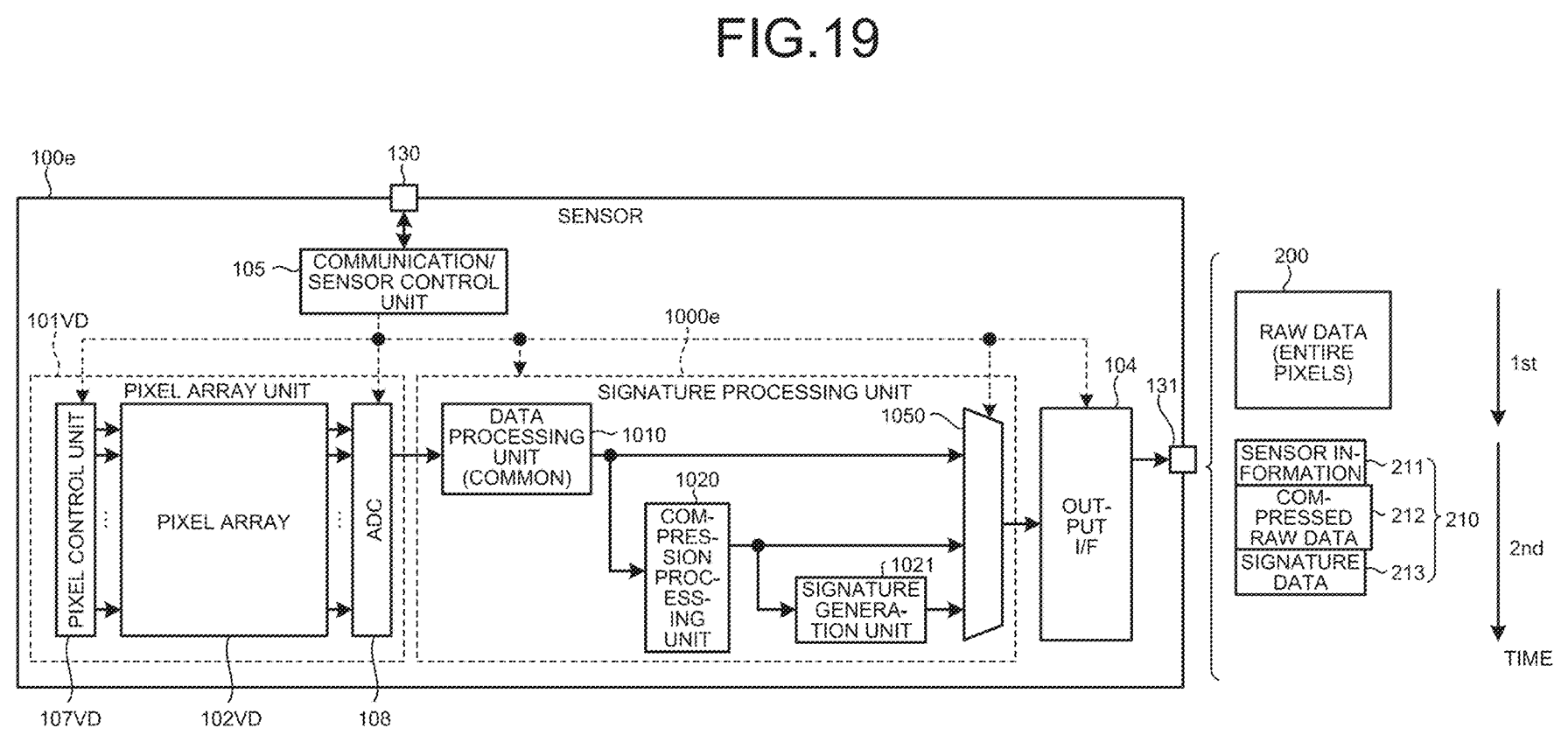

Next, a configuration example of a sensor according to the fifth embodiment will be described. FIG. 19 is a block diagram illustrating a configuration of an example of a sensor according to the fifth embodiment. In FIG. 19, a sensor 100e includes a pixel array unit 101VD and a signature processing unit 1000e. The pixel array unit 101VD includes a pixel array 102VD using the above-described pixel 103VD and a pixel control unit 107VD for driving the pixel 103VD.

RAW data 200 output from the pixel array unit 101VD is input to the signature processing unit 1000e and supplied to a data processing unit 1010. The data processing unit 1010 performs predetermined data processing on the supplied RAW data 200 and supplies the processed RAW data 200 to a selector 1050 and a compression processing unit 1020.

The compression processing unit 1020 performs compression processing of compressing the data amount on the supplied RAW data 200 to generate compressed RAW data 212. The compression processing unit 1020 supplies the generated compressed RAW data 212 to the selector 1050 and a signature generation unit 1021. The signature generation unit 1021 generates signature data 213 based on the supplied compressed RAW data 212, and supplies the generated signature data 213 to the selector 1050.

Under the control of a communication/sensor control unit 105, the selector 1050 selects data to be output from among the RAW data 200 supplied from the data processing unit 1010, the compressed RAW data 212 supplied from the frame memory 1040, and the signature data 213 supplied from the signature generation unit 1021, and supplies the selected data to an output I/F 104. The output I/F 104 outputs the supplied data from an interface 131.

Here, the pixel 103VD can read the pixel signal generated by exposure performed once a plurality of times. On the other hand, the quality of the pixel signal read from the pixel 103VD deteriorates each time the pixel signal is read due to the influence of noise caused by the switch. In addition, although image quality is not regarded as important in the authenticity proof data 210, for example, noise can be reduced by processing such as obtaining an addition average of pixel data together with data amount compression processing in the compression processing unit 1020.

Based on the characteristics of these pixels 103VD, the sensor 100e selects the RAW data 200 based on the pixel signal read first by the selector 1050 for one exposure, and outputs the selected RAW data 200 from the interface 131 (1st). Next, the sensor 100e selects, by the selector 1050, the compressed RAW data 212 obtained by compressing the data amount of the RAW data 200 by the compression processing unit 1020 based on the pixel signal read again for the exposure, and the signature data 213 generated by the signature generation unit 1021 based on the compressed RAW data 212, adds sensor information 211, and outputs the data as the authenticity proof data 210 (2nd).

As described above, in the fifth embodiment, the RAW data 200 based on the pixel signal first read from each pixel 103VD for one exposure is output from the interface 131. Next, the compressed RAW data 212 and the signature data 213 are generated based on the pixel signal read again from each pixel 103VD for the exposure, and the authenticity proof data 210 is output. As a result, the RAW data 200 can be output with high quality, and the authenticity proof data 210 based on the pixel signal generated again by the same exposure as the RAW data 200 can be output.

In addition, since the reset level and the signal level of each pixel 103VD are held in the capacitive elements 521 and 522, the entire pixel array 102VD can be regarded as a frame memory, and it is not necessary to separately provide a frame memory.

9. Sixth Embodiment of Present Disclosure

Next, a sixth embodiment of the present disclosure will be described. The sixth embodiment is an example in which imaging for two frames is continuously performed. In this case, for example, the RAW data 200 obtained by the first imaging is output from the interface 131. Next, the compressed RAW data 212 and the signature data 213 are generated based on the RAW data 200 obtained by the second imaging, and the same are output as the authenticity proof data 210. Under the premise that there is no abrupt scene change in the subject, it can be regarded that the two images continuously captured are the same, and the authenticity proof of the RAW data 200 based on the first imaging can be executed using the authenticity proof data 210 based on the second imaging.

Figure 20:
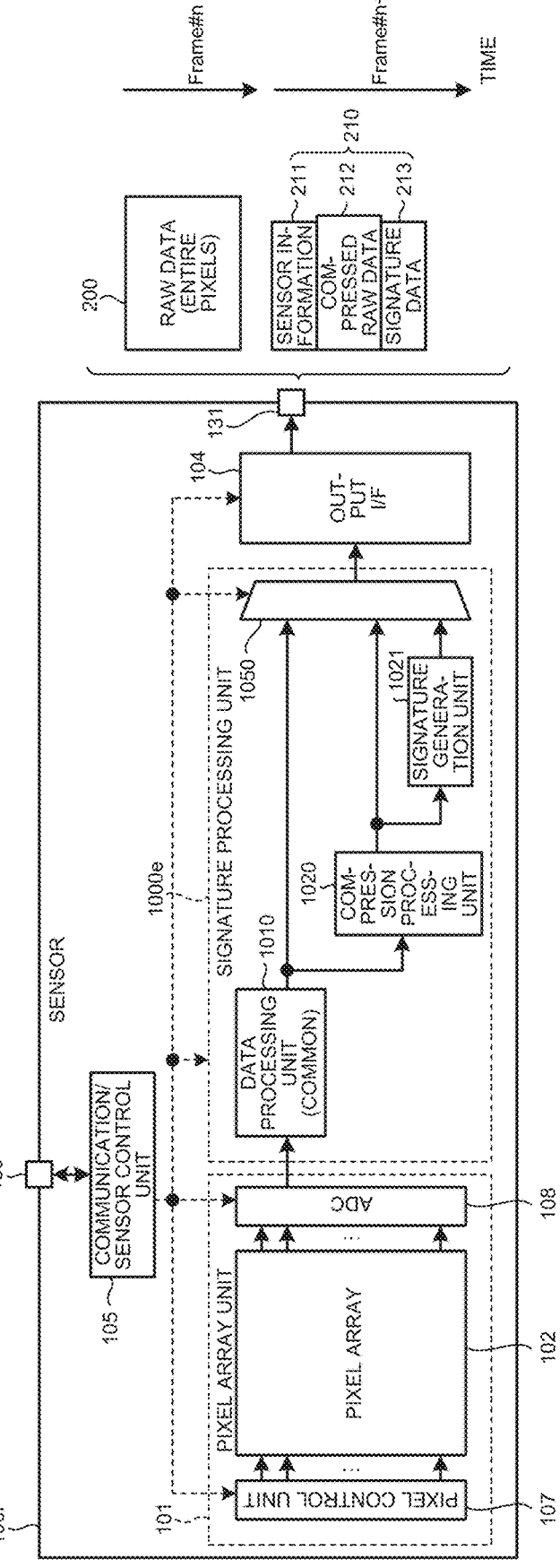
FIG. 20 is a block diagram illustrating a configuration of an example of a sensor according to a sixth embodiment.

FIG. 20 is a block diagram illustrating a configuration of an example of a sensor according to the sixth embodiment. A sensor 100f illustrated in FIG. 20 has the same configuration as the sensor 100e illustrated in FIG. 19 except that the pixel 103 that is not the voltage holding type is used in a pixel array unit 101.

In the example of FIG. 20, the sensor 100f outputs RAW data 200 captured in the n-th frame from an interface 131 (Frame #n). Then, the sensor 100f adds sensor information 211 to compressed RAW data 212 based on the RAW data 200 captured in the next (n+1)th frame and signature data 213 generated based on the compressed RAW data 212, and outputs the data as authenticity proof data 210 from the interface 131.

It is noted that the present disclosure is not limited to this example, and the sensor 100f may output the authenticity proof data 210 in the n-th frame and output the RAW data 200 in the next (n+1)th frame.

As described above, in the sixth embodiment, the sensor 100f separates imaging for outputting the RAW data 200 from imaging for generating and outputting the authenticity proof data 210. Therefore, even in a configuration in which the RAW data 200 and the authenticity proof data 210 are output from one interface 131, it is not necessary to provide a frame memory.

10. Seventh Embodiment of Present Disclosure

Next, a seventh embodiment of the present disclosure will be described. The seventh embodiment is an example in which the authenticity proof of the output image data 230 is performed using the authenticity proof data 210 output from the camera 10 (sensors 100a to 100f) in the first to sixth embodiments described above.

(10-1. System Configuration for Proving Authenticity of Image According to Seventh Embodiment)

Figure 21:
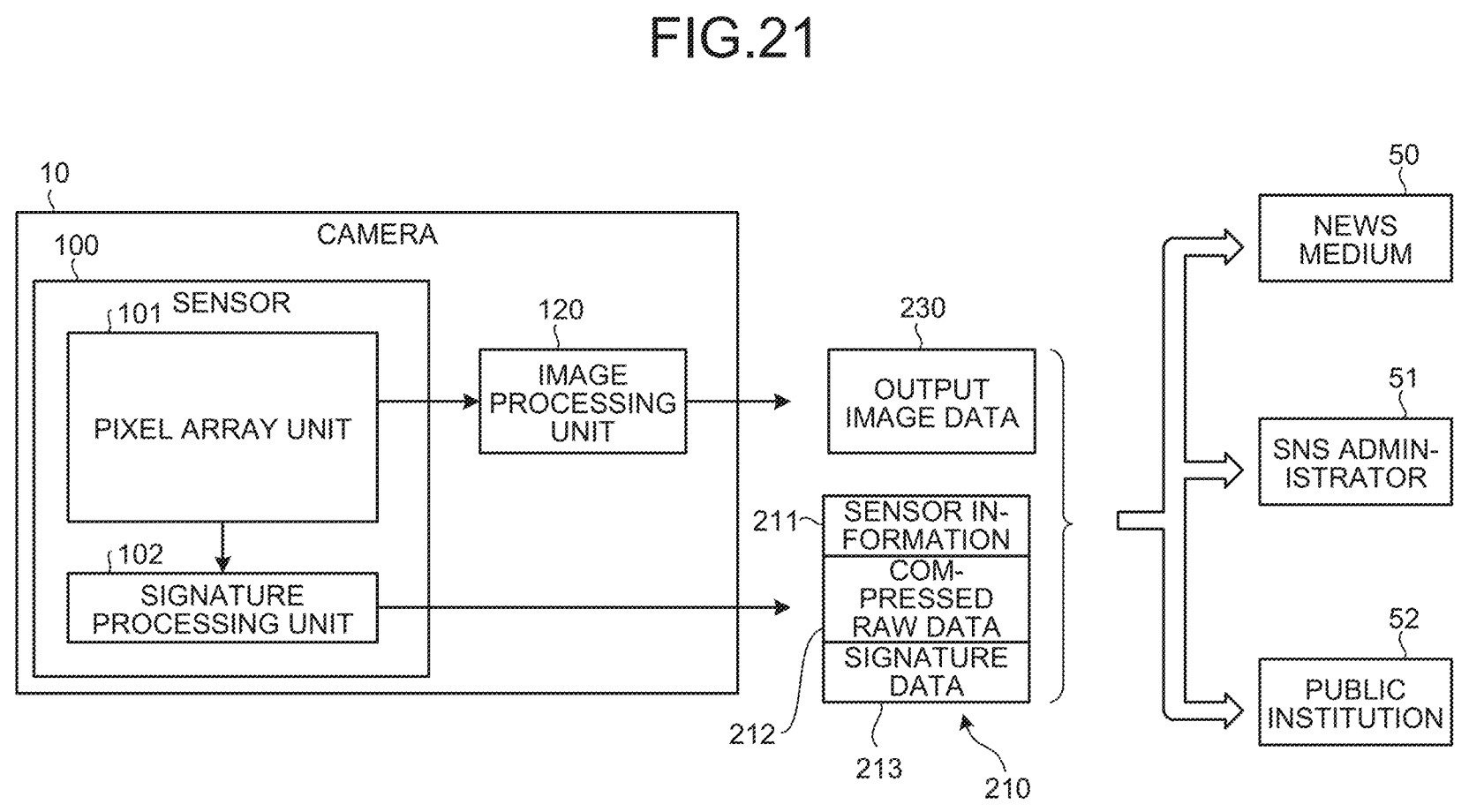

A system configuration for performing authenticity proof of an image according to the seventh embodiment will be schematically described. FIG. 21 is a schematic diagram illustrating an execution example of authenticity proof of an image. The output image data 230 output from the camera 10 to which each embodiment is applied is finally authenticated by a person (organization) who posts the output image data 230, a person (organization) who makes evidence determination based on the output image data 230, or the like. This authenticity proof is performed by comparing the image of the compressed RAW data 212 included in the authenticity proof data 210 output from the camera 10 in association with the output image data 230 with the image of the output image data 230.

The output image data 230 is disclosed by a news medium 50 such as a newspaper company, a television station, and a news site. The news medium 50 or a third-party organization acquires the output image data 230 and the authenticity proof data 210 corresponding to the output image data 230, and discloses the output image data 230, which is proved to be authentic (not falsified) based on the compressed RAW data 212 included in the authenticity proof data 210, as, for example, a news image.

In another example, the output image data 230 is disclosed to an account holder by a social networking service (SNS). An SNS administrator 51 or a third party organization acquires the output image data 230 and the authenticity proof data 210 corresponding to the output image data 230, and posts the output image data 230, which is proved to be authentic (not falsified) based on the compressed RAW data 212 included in the authenticity proof data 210, on the SNS "with a guarantee that the data is authentic (not falsified)".

In still another example, the output image data 230 is used as an evidence image, an attestation image, or the like by a public institution 52. As the public institution 52 in this case, a court or a passport issuing authority (the Ministry of Foreign Affairs or the like) can be considered. For example, the public institution 52 certificates only an image based on the output image data 230 with which the signature data 213 is associated and which is proved to be authentic (not falsified) as a document of public certification.

Figure 22:
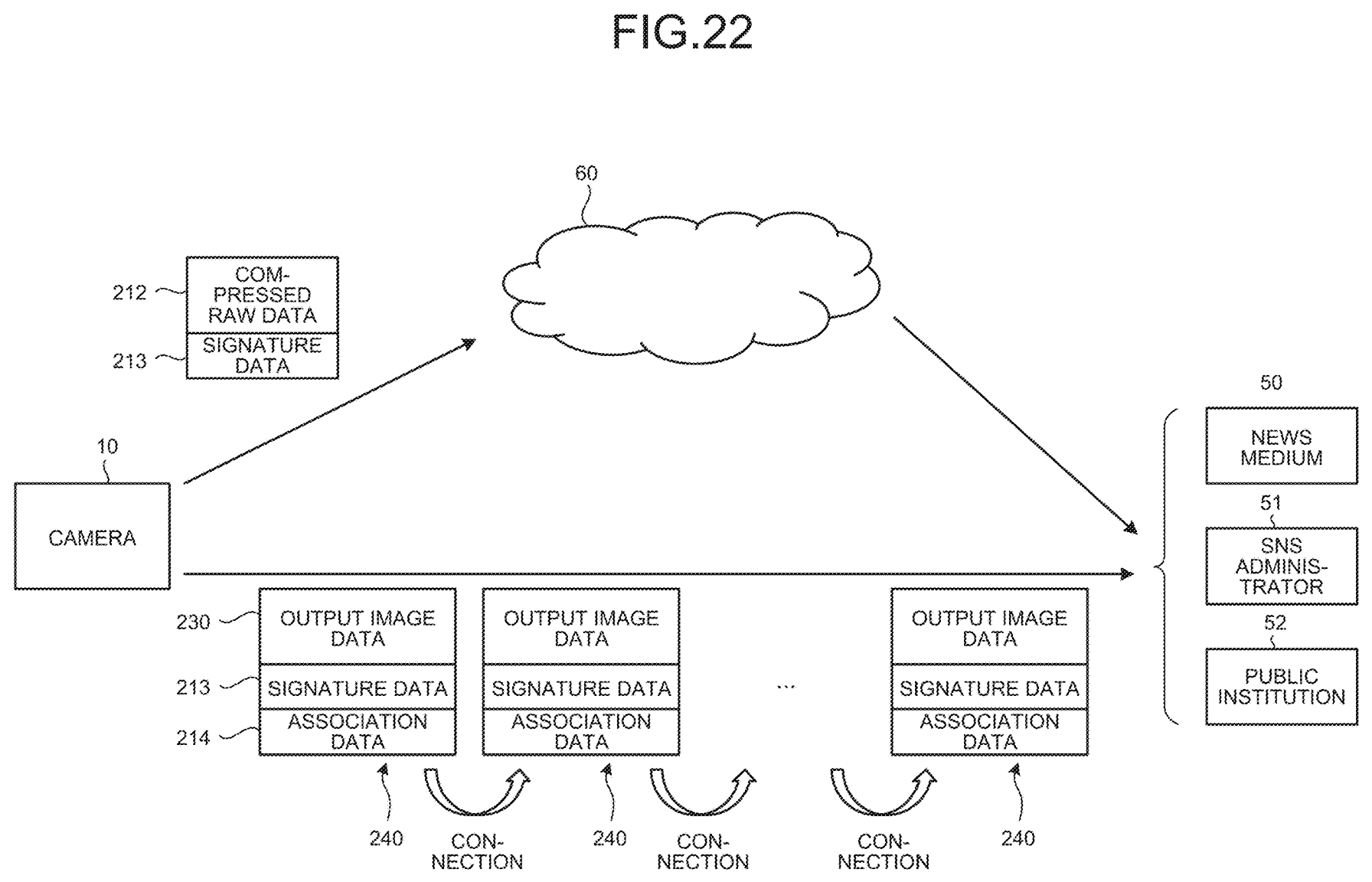

FIG. 22 is a schematic diagram schematically illustrating a system configuration for performing authenticity proof of an image according to the seventh embodiment.

In FIG. 22, the camera 10 outputs the output image data 230 and the authenticity proof data 210. Among these, the compressed RAW data 212 and the signature data 213 included in the authenticity proof data 210 are transmitted to, for example, a cloud computing service 60 via the Internet, and the same are stored in a server in the cloud computing service 60. The news medium 50, the SNS administrator 51, or the public institution 52 can access the cloud computing service 60 and acquire the compressed RAW data 212 and the signature data 213 stored in the server.

On the other hand, the output image data 230 output from the camera 10 is added with an association data 214 indicating an association between the signature data 213 corresponding to the output image data 230 and the compressed RAW data 212 corresponding to the output image data 230, and the same is delivered to the news medium 50, the SNS administrator 51, or the public institution 52 as authenticity proof data 240. At this time, the authenticity proof data 240 is connected to the authenticity proof data 240 corresponding to the other output image data 230 in a non-modifiable state using a technique such as a known blockchain.

The news medium 50, the SNS administrator 51, or the public institution 52 acquires the desired authenticity proof data 240 from each of the connected authenticity proof data 240. Based on the association data 214 included in the acquired authenticity proof data 240, the news medium 50, the SNS administrator 51, or the public institution 52 acquires the compressed RAW data 212 and the signature data 213 corresponding to the authenticity proof data 240 stored in the server in the cloud computing service 60.

Based on the signature data 213 acquired from the cloud computing service 60, the news medium 50, the SNS administrator 51, or the public institution 52 confirms that the compressed RAW data 212 acquired together with the signature data 213 is not falsified.

Figure 23:
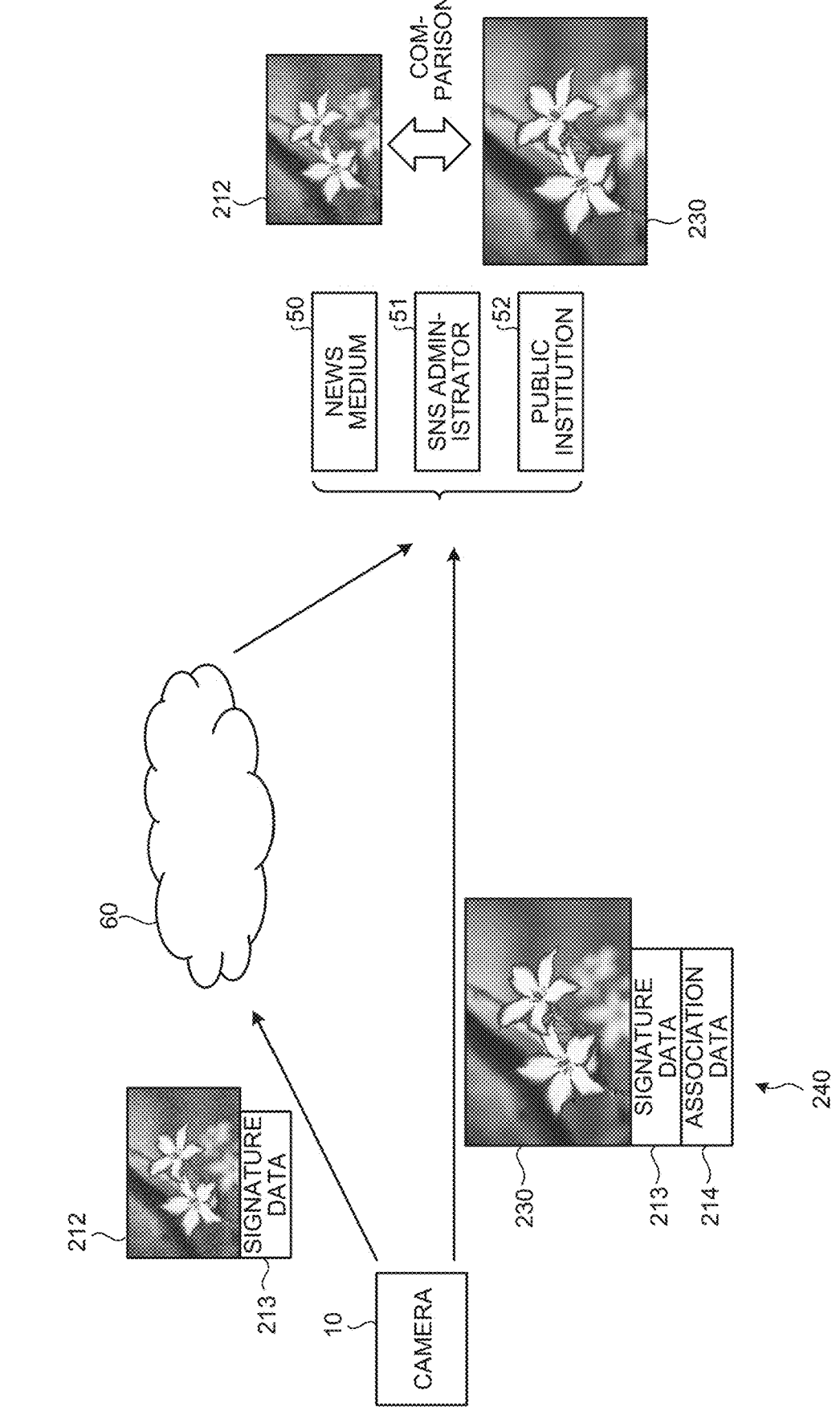
FIG. 23 is a diagram schematically illustrating the authenticity proof of the image according to the seventh embodiment.

As schematically illustrated in FIG. 23, the news medium 50, the SNS administrator 51, or the public institution 52 compares the compressed RAW data 212 confirmed not to be falsified based on the signature data 213 with the output image data 230 included in the acquired authenticity proof data 240, and performs authenticity proof for the output image data 230. For example, the news medium 50, the SNS administrator 51, or the public institution 52 obtains a similarity between the compressed RAW data 212 and the output image data 230, and prove the authenticity of the output image data 230 based on the obtained similarity therebetween.

The news medium 50, the SNS administrator 51, or the public institution 52 posts the output image data 230 proved to be authentic (not falsified) by the authenticity proof, or uses the output image data as an evidence image or an attestation image thereof.

(10-2. Image Comparison Processing According to Seventh Embodiment)

Next, comparison processing between the output image data 230 and the compressed RAW data 212 according to the seventh embodiment will be described more specifically. Various methods can be considered for image comparison. Here, as an example of an image comparison method, a first comparison method based on an edge (contour) of an object included in an image and a second comparison method using color information of the image will be described.

(First Comparison Method)

A first comparison method will be described. In the first comparison method, when performing the comparison, first, processing of adjusting the size of the image by the compressed RAW data 212 to the size of the image by the output image data 230, which is a target for performing authenticity proof, is performed.

For example, in a case where the data amount of the compressed RAW data 212 is compressed by the first compression method described with reference to FIG. 10, in which a predetermined number of pixels 103 are combined into one pixel, the size in each of the vertical and horizontal directions of the image by the compressed RAW data 212 is enlarged using linear interpolation or the like. By the enlargement processing in each of the vertical and horizontal directions, the size of the image by the compressed RAW data 212 is adjusted to the size of the image by the output image data 230.

Furthermore, for example, in a case where the data amount of the compressed RAW data 212 is compressed by the second compression method of performing line thinning described with reference to FIG. 11, the size in the vertical direction of the image by the compressed RAW data 212 is enlarged using linear interpolation or the like. By the enlargement processing in the vertical direction, the size of the image by the compressed RAW data 212 is adjusted to the size of the image by the output image data 230.

On the other hand, in a case where the data amount of the compressed RAW data 212 is compressed by the third compression method of reducing the number of bits for each pixel described with reference to FIG. 12, the size of the reference image is the same as the size of the target image, and as such, size matching processing is unnecessary.

Figure 24:
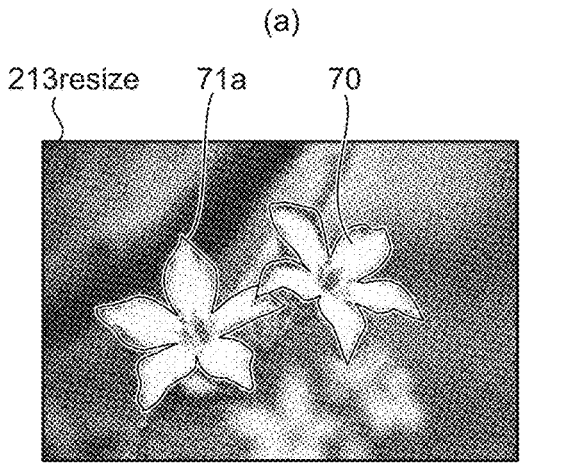
FIG. 24 is a diagram illustrating a first comparison method based on an edge (contour) of an object included in an image, which is applicable to the seventh embodiment.
Figure 24:
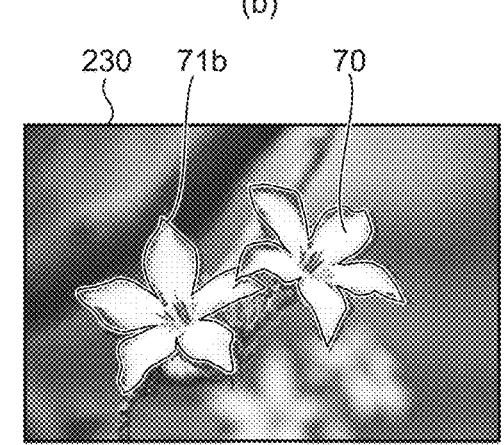

FIG. 24 is a diagram illustrating the first comparison method based on an edge (contour) of an object included in an image, which is applicable to the seventh embodiment.

In FIG. 24, a section (a) schematically illustrates an example of an image by compressed RAW data 212 resize in which size adjustment is performed as described above. Furthermore, a section (b) illustrates an example of an image based on the output image data 230. Since the compressed RAW data 212 resize is not subjected to demosaic processing, the appearance when viewed is different from the image based on the output image data 230 illustrated in the section (b).

As illustrated in the sections (a) and (b) of FIG. 24, the same object 70 is included in the image by the compressed RAW data 212 resize and the image by the output image data 230.

As illustrated in the section (a) of FIG. 24, an edge 71a of the object 70 included in the image is detected using a known edge detection method with respect to the image by the compressed RAW data 212 resize. As an example of the edge detection method, a method using a first order differential filter such as a Sobel filter is known. Similarly, as illustrated in the section (b), an edge 71b of the object 70 included in the image is detected with respect to the image by the output image data 230.

A feature amount is calculated for each of the edge 71a detected from the image by the compressed PAW data 212 resize and the edge 71b detected from the image by the output image data 230. Based on the feature amount of the edge 71a and the feature amount of the edge 71b, for example, a similarity between the edge 71a and the edge 71b can be obtained by taking a difference between the feature amount of the edge 71a and the feature amount of the edge 71b. When the obtained similarity is equal to or greater than a threshold value, it is determined that the image based on the output image data 230 is authentic (not falsified).

(Second Comparison Method)

A second comparison method will be described. In the second comparison method, when comparison is performed, first, demosaic processing is performed on the compressed RAW data 212 to restore color information of an image by the compressed RAW data 212. The color information of the image by the compressed RAW data 212 in which the color information is restored is compared with color information of an image by the output image data 230.

Figure 25:
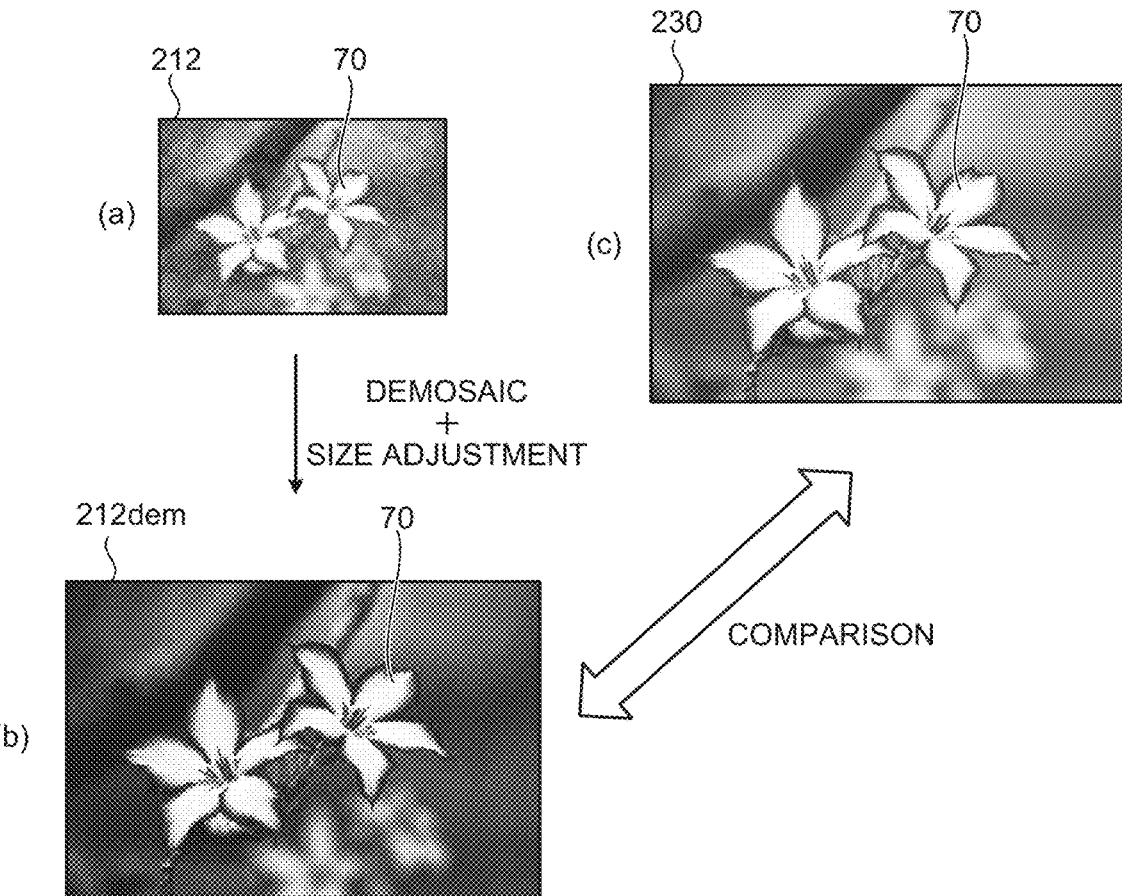
FIG. 25 is a diagram illustrating a second comparison method using up to color information of an image, which is applicable to the seventh embodiment.

FIG. 25 is a diagram illustrating a second comparison method using up to color information of an image, which is applicable to the seventh embodiment. In the second comparison method, color information is restored by performing demosaic processing on the compressed PAW data 212 illustrated in a section (a) of FIG. 25, and further, as described in the first comparison method, enlargement processing or the like is performed on an image by the compressed RAW data 212, and the size of the image is adjusted to the size of an image by the output image data 230. A section (b) of FIG. 25 illustrates an example of an image by compressed RAW data 212dem obtained by performing demosaic processing and size adjustment processing on the compressed RAW data 212.

The color information of the compressed RAW data 212dem is compared with the color information of the output image data 230 illustrated in a section (c) of FIG. 25 to obtain a similarity between the compressed RAW data 212dem and the output image data 230. For example, a feature amount regarding color information is calculated for each of the compressed RAW data 212dem and the output image data 230. Based on the feature amount of the color information of the compressed RAW data 212dem and the feature amount of the color information of the output image data 230, for example, a similarity between the compressed RAW data 212dem and the output image data 230 can be obtained by taking a difference between the feature amount of the color information of the compressed RAW data 212dem and the feature amount of the color information of the output image data 230. When the obtained similarity is equal to or greater than a threshold value, it is determined that the image based on the output image data 230 is authentic (not falsified).

It is noted that, in the second comparison method, comparison based on color information and comparison based on an edge of an object by the first comparison method can be executed in combination.

Both the first and second comparison methods described above are executed by calculation using a processor such as a central processing unit (CPU). The present disclosure is not limited to this example, and it is also possible to visually compare the image by the compressed RAW data 212 with the image by the output image data 230 to prove the authenticity of the output image data 230. In this case, as the image based on the compressed RAW data 212, it is preferable to use an image obtained by performing at least demosaic processing on the compressed RAW data 212 to restore color information.

It is noted that the effects described in the present specification are merely examples and are not limited, and other effects may be obtained.

It is noted that the present technology can also have the following configurations.

(1) An imaging apparatus comprising:

a pixel array unit including a plurality of pixels arranged in a matrix array, each of the pixels generating a pixel signal corresponding to light received by exposure, the pixel array unit acquiring image data based on each of the pixel signals respectively generated by the plurality of pixels;

a compression unit configured to compress a data amount of the image data to generate compressed image data;

a signature generation unit configured to generate signature data based on the compressed image data; and an output unit configured to output the image data and authenticity proof data obtained by adding the signature data to the compressed image data.

(2) The imaging apparatus according to the above (1), wherein the output unit includes:

a first output terminal configured to output the image data; and a second output terminal configured to output the authenticity proof data.

(3) The imaging apparatus according to the above (1), wherein the output unit includes a line memory configured to store the image data on a line-by-line basis in a row direction in the matrix array, and outputs, from an output terminal, the image data and the authenticity proof data by time division on the line-by-line basis using the line memory.

(4) The imaging apparatus according to the above (1), further comprising a frame memory configured to store the compressed image data corresponding to the image data of at least one frame, wherein the signature generation unit generates the signature data based on the compressed image data stored in the frame memory, and the output unit outputs, from an output terminal, the image data of the one frame, and outputs, from the output terminal, the authenticity proof data obtained by adding the signature data generated based on the compressed image data stored in the frame memory to the compressed image data.

(5) The imaging apparatus according to the above (1), further comprising a frame memory configured to store the image data of at least one frame acquired by the pixel array unit, wherein the compression unit generates the compressed image data based on the image data stored in the frame memory, and the output unit outputs, from an output terminal, the image data acquired by the pixel array unit, and outputs, from the output terminal, the authenticity proof data obtained by adding, to the compressed image data, the signature data generated by the signature generation unit based on the compressed image data generated by the compression unit using the image data stored in the frame memory.

(6) The imaging apparatus according to the above (1), wherein each of the plurality of pixels is a voltage holding type pixel including a holding unit configured to hold the pixel signal corresponding to the received light, the compression unit generates the compressed image data based on the image data by the pixel signal held in the holding unit provided in each of the plurality of pixels, and the output unit outputs, from an output terminal, the image data based on the pixel signal read from the holding unit provided in each of the plurality of pixels, and outputs, from the output terminal, the authenticity proof data obtained by adding, to the compressed image data, the signature data generated by the signature generation unit based on the compressed image data generated by the compression unit using the image data based on the pixel signal read again from the holding unit provided in each of the plurality of pixels.

(7) The imaging apparatus according to the above (1), wherein the output unit outputs, from an output terminal, the image data based on the pixel signal generated by first exposure, and outputs, from the output terminal, the image data based on the pixel signal generated by second exposure following the first exposure.

(8) The imaging apparatus according to any one of the above (1) to (7), wherein the pixel array unit includes a plurality of types of optical filters having different optical characteristics, each of the optical filters being provided for each of the plurality of pixels according to a predetermined pattern, and the compression unit compresses the data amount of the image data by adding a pixel signal to each of a predetermined number of pixels respectively having the optical filters corresponding to the types provided therein among the plurality of pixels, the predetermined number of pixels being disposed close to each other in the array, and combining the predetermined number of pixels into one pixel.

(9) The imaging apparatus according to any one of the above (1) to (8), wherein the compression unit compresses the data amount of the image data by deleting a lower bit of pixel data based on a pixel signal of each of the plurality of pixels included in the image data and reducing the number of bits of the pixel data.

(10) The imaging apparatus according to the above (9), wherein the compression unit deletes the lower bit of the pixel data subjected to gradation compression processing.

(11) The imaging apparatus according to any one of the above (1) to (10), wherein the compression unit compresses the data amount of the image data based on continuity of an image.

(12) The imaging apparatus according to any one of the above (1) to (11), wherein the compression unit compresses the data amount of the image data by thinning the image data on a pixel-by-pixel basis.

(13) The imaging apparatus according to the above (12), wherein the compression unit performs the thinning on the image data on a line-by-line basis in a row direction in the matrix array.

(14) The imaging apparatus according to the above (13), wherein the pixel array unit includes a plurality of types of optical filters having different optical characteristics, each of the optical filters being provided for each of the plurality of pixels according to a predetermined pattern, and the compression unit performs thinning on a line-by-line basis according to repetition in a column direction in the matrix array in the predetermined pattern.

(15) The imaging apparatus according to any one of the above (1) to (14), wherein the pixel array unit, the compression unit, the signature generation unit, and the output unit are formed to be integrated.

(16) The imaging apparatus according to the above (15), further comprising:

a first chip on which the pixel array unit is disposed; and a second chip on which the compression unit, the signature generation unit, and the output unit are disposed, the second chip being bonded to the first chip.

(17) An imaging method executed by a processor, the imaging method comprising:

an acquisition step of acquiring image data by each of pixel signals generated by a plurality of pixels, the pixel signals being acquired by a pixel array unit including the plurality of pixels arranged in a matrix array, each of the pixels generating the pixel signal corresponding to received light;

a compression step of compressing a data amount of the image data to generate compressed image data;

a signature generation step of generating signature data based on the compressed image data; and an output step of outputting the image data and authenticity proof data obtained by adding the signature data to the compressed image data.

REFERENCE SIGNS LIST

10, 2000 CAMERA
50 NEWS MEDIUM
51 SNS ADMINISTRATOR
52 PUBLIC INSTITUTION
60 CLOUD COMPUTING SERVICE
70 OBJECT
71$a$, 71$b$ EDGE
100, 100$a$, 100$b$, 100$c$, 100$d$, 100$e$, 100$f$, 2100 SENSOR
101, 101VD PIXEL ARRAY UNIT
102, 102VD PIXEL ARRAY
103, 103B, 103B$_{add}$, 103G, 103G$_{add}$, 103R, 103R$_{add}$, 103R$_1$, 103R$_2$, 103R$_3$, 103R$_4$, 103VD PIXEL
104 OUTPUT I/F
105 COMMUNICATION/SENSOR CONTROL UNIT
108 ADC
120 IMAGE PROCESSING UNIT
131, 132 INTERFACE
200 RAW DATA
210, 240 AUTHENTICITY PROOF DATA
211 SENSOR INFORMATION
212, 212 resize, 212$dem$ COMPRESSED RAW DATA
213 SIGNATURE DATA
230, 2230 OUTPUT IMAGE DATA
1000, 1000$a$, 1000$b$, 1000$c$, 1000$d$, 1000$e$ SIGNATURE PROCESSING UNIT
1010, 1010$a$, 1010$b$ DATA PROCESSING UNIT
1020 COMPRESSION PROCESSING UNIT
1021 SIGNATURE GENERATION UNIT
1030 ARBITER
1031 LINE MEMORY
1040, 1041 FRAME MEMORY
1050, 1051 SELECTOR

The invention claimed is:

1. An imaging apparatus comprising:

an image sensor including a plurality of pixels arranged in a matrix array, each of the pixels generating a pixel signal corresponding to light received by exposure, the image sensor acquiring image data based on each of the pixel signals respectively generated by the plurality of pixels, the image data including first frame data and second frame data, the first frame data and the second frame data representing consecutive frames; and one or more electronic processors configured to:

compress a first data amount of the first frame data to generate first compressed image data;

compress a second data amount of the second frame data to generate second compressed image data;

generate signature data based on the second compressed image data and not the first compressed image data, the signature data serving as authenticity proof data for both the first frame data and the second frame data; and output the image data and authenticity proof data obtained by adding the signature data to the second compressed image data.

2. The imaging apparatus according to claim 1, wherein the one or more electronic processors are further configured to:

output the image data via a first output terminal; and output the authenticity proof data via a second output terminal.

3. The imaging apparatus according to claim 1, further comprising:

a line memory configured to store the image data on a line-by-line basis in a row direction in the matrix array, and wherein the one or more electronic processors are further configured to output, from an output terminal, the image data and the authenticity proof data by time division on the line-by-line basis using the line memory.

4. The imaging apparatus according to claim 1, further comprising:

a frame memory configured to store the second compressed image data, wherein the one or more electronic processors are further configured to:

generate the signature data based on the second compressed image data stored in the frame memory, output, from an output terminal, the image data, and output, from the output terminal, the authenticity proof data obtained by adding the signature data generated based on the second compressed image data stored in the frame memory to the second compressed image data.

5. The imaging apparatus according to claim 1, further comprising:

a frame memory configured to store the image data of at least one frame acquired by the image sensor, wherein the one or more electronic processors are further configured to:

generate the second compressed image data based on the image data stored in the frame memory, and output, from an output terminal, the image data acquired by the image sensor, and output, from the output terminal, the authenticity proof data obtained by adding, to the second compressed image data, the signature data generated based on the second compressed image data generated using the image data stored in the frame memory.

6. The imaging apparatus according to claim 1, wherein:

each of the plurality of pixels is a voltage holding type pixel including a holding circuit configured to hold the pixel signal corresponding to the received light, the one or more electronic processors are further configured to:

generate the second compressed image data based on the image data by the pixel signal held in the holding circuit provided in each of the plurality of pixels, output, from an output terminal, the image data based on the pixel signal read from the holding circuit provided in each of the plurality of pixels, and output, from the output terminal, the authenticity proof data obtained by adding, to the second compressed image data, the signature data generated based on the second compressed image data generated using the image data based on the pixel signal read again from the holding circuit provided in each of the plurality of pixels.

7. The imaging apparatus according to claim 1, wherein: the one or more electronic processors are further configured to:

output, from an output terminal, the image data based on the pixel signal generated by a first exposure, and output, from the output terminal, the image data based on the pixel signal generated by a second exposure following the first exposure.

8. The imaging apparatus according to claim 1, wherein: the image sensor includes a plurality of types of optical filters having different optical characteristics, each of the optical filters being provided for each of the plurality of pixels according to a predetermined pattern, and the one or more electronic processors are further configured to:

compresses the data amount of the image data by adding a pixel signal to each of a predetermined number of pixels respectively having the optical filters corresponding to the types provided therein among the plurality of pixels, the predetermined number of pixels being disposed close to each other in the array, and combining the predetermined number of pixels into one pixel.

9. The imaging apparatus according to claim 1, wherein the one or more electronic processors are further configured to:

compress the second data amount of the second frame data by deleting a lower bit of pixel data based on a pixel signal of each of the plurality of pixels included in the image data and reducing a number of bits of the pixel data.

10. The imaging apparatus according to claim 9, wherein the one or more electronic processors are further configured to:

delete the lower bit of the pixel data subjected to gradation compression processing.

11. The imaging apparatus according to claim 1, wherein the one or more electronic processors are further configured to:

compress the second data amount of the second frame data based on continuity of an image.

12. The imaging apparatus according to claim 1, wherein the one or more electronic processors are further configured to:

compress the second data amount of the second frame data by thinning the second frame data on a pixel-by-pixel basis.

13. The imaging apparatus according to claim 12, wherein the one or more electronic processors are further configured to:

performs the thinning on the second frame data on a line-by-line basis in a row direction in the matrix array.

14. The imaging apparatus according to claim 13, wherein:

the image sensor includes:

a plurality of types of optical filters having different optical characteristics, each of the optical filters being provided for each of the plurality of pixels according to a predetermined pattern, and the one or more electronic processors are further configured to:

perform thinning on a line-by-line basis according to repetition in a column direction in the matrix array in the predetermined pattern.

15. The imaging apparatus according to claim 1, wherein: the one or more electronic processors are formed to be integrated.

16. The imaging apparatus according to claim 15, wherein the one or more electronic processors comprise:

a first chip; and a second chip, the second chip being bonded to the first chip.

17. An imaging method executed by a processor, the imaging method comprising:

an acquisition step of acquiring image data by each of pixel signals generated by a plurality of pixels, the image data including first frame data and second frame data, the first frame data and the second frame data representing consecutive frames, the pixel signals being acquired by an image sensor including the plurality of pixels arranged in a matrix array, each of the pixels generating the pixel signal corresponding to received light;

a first compression step of compressing a first data amount of the first frame data to generate first compressed image data;

a second compression step of compressing a second data amount of the second frame data to generate compressed image data;

a signature generation step of generating signature data based on the second compressed image data and not the first compressed image data, the signature data serving as authenticity proof data for both the first frame data and the second frame data; and an output step of outputting the image data and authenticity proof data obtained by adding the signature data to the second compressed image data.

* * * * *